(12) United States Patent
Gkantsidis et al.

(10) Patent No.: US 9,817,860 B2
(45) Date of Patent: Nov. 14, 2017

(54) GENERATION AND APPLICATION OF CORRECTNESS-ENFORCED EXECUTABLE FILTERS

(75) Inventors: Christos Gkantsidis, Cambridge (GB); Dimitrios Vytiniotis, Cambridge (GB); Orion Hodson, Cambridge (GB); Dushyanth Narayanan, Cambridge (GB); Antony Rowstron, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 464 days.

(21) Appl. No.: 13/324,202

(22) Filed: Dec. 13, 2011

(65) Prior Publication Data

US 2013/0152088 A1    Jun. 13, 2013

(51) Int. Cl.
| | |
|---|---|
| *G06F 9/46* | (2006.01) |
| *G06F 9/455* | (2006.01) |
| *G06F 17/30* | (2006.01) |
| *G06F 9/54* | (2006.01) |

(52) U.S. Cl.
CPC .......... *G06F 17/30386* (2013.01); *G06F 9/54* (2013.01); *G06F 2209/542* (2013.01)

(58) Field of Classification Search
None
See application file for complete search history.

(56) References Cited

U.S. PATENT DOCUMENTS

| | | | | |
|---|---|---|---|---|
| 6,604,143 | B1* | 8/2003 | Nagar et al. | 709/229 |
| 7,024,593 | B1* | 4/2006 | Budd et al. | 714/48 |
| 7,437,718 | B2* | 10/2008 | Fournet et al. | 717/133 |
| 2002/0099829 | A1* | 7/2002 | Richards et al. | 709/227 |
| 2004/0044781 | A1* | 3/2004 | Hymel et al. | 709/229 |
| 2008/0189236 | A1* | 8/2008 | Foster et al. | 707/1 |
| 2009/0327220 | A1* | 12/2009 | Meijer et al. | 707/3 |
| 2010/0138677 | A1 | 6/2010 | Pagan et al. | |
| 2010/0306776 | A1 | 12/2010 | Greene | |
| 2012/0072578 | A1* | 3/2012 | Alam | 709/224 |
| 2013/0173695 | A1* | 7/2013 | Arsenault | 709/203 |

OTHER PUBLICATIONS

Hubert et al., Sawja: Static Analysis Workshop for Java, Jul. 19, 2010, The International Conference on Formal Verification of Object-Oriented Software, pp. 253-267.*

(Continued)

*Primary Examiner* — Bradley Teets

(57) ABSTRACT

Methods of generating filters automatically from data processing jobs are described. In an embodiment, these filters are automatically generated from a compiled version of the data processing job using static analysis which is applied to a high-level representation of the job. The executable filter is arranged to suppress rows and/or columns within the data to which the job is applied and which do not affect the output of the job. The filters are generated by a filter generator and then stored and applied dynamically at a filtering proxy that may be co-located with the storage node that holds the data. In another embodiment, the filtered data may be cached close to a compute node which runs the job and data may be provided to the compute node from the local cache rather than from the filtering proxy.

20 Claims, 14 Drawing Sheets

(56) References Cited

OTHER PUBLICATIONS

Hindman, et al., "Mesos: A Platform for Fine-Grained Resource Sharing in the Data Center", In Proceedings of The 8th USENIX Symposium on Networked Systems Desing and Implementation, Mar. 30-Apr. 1, 2011, 14 pages.
Benson, et al., "Understanding Data Center Traffic Characteristics", In Proceedings of ACM SIGCOMM Computer Communication Review, vol. 40, Issue 1, Jan. 2010, pp. 92-99.
Greenberg, et al., "VL2: A Scalable and Flexible Data Center Network", In Proceedings of the ACM SIGCOMM Conference on Data Communication, Aug. 17-21, 2009, pp. 51-62.
Chowdhury, et al., "Managing Data Transfers in Computer Clusters with Orchestra", In Proceedings of the ACM SIGCOMM Conference on SIGCOMM, Aug. 15-19, 2011, pp. 98-109.
Li, et al., "Scalable Data Center Multicast using Multi-class Bloom Filter", In Proceedings of SCE Meeting Room, Aug. 8, 2011, 10 pages.
Amazon Elastic Compute Cloud (Amazon EC2). aws.amazon.com/ec2/.
Amazon Elastic MapReduce. aws.amazon.com/elasticmapreduce/.
Amazon Simple Storage Service (Amazon S3). aws.amazon.com/s3/.
S. Anand, C. S. Pasareanu, and W. Visser. JPF-SE: A symbolic execution extension to Java PathFinder. In O. Grumberg and M. Huth, editors, TACAS, vol. 4424 of Lecture Notes in Computer Science, pp. 134-138. Springer, 2007.
G. Ananthanarayanan, S. Kandula, A. Greenberg, I. Stoica,Y. Lu, B. Saha, and E. Harris. Reining in the outliers in Map-Reduce clusters using Mantri. In OSDI, 2010.
Windows Azure Compute. www.microsoft.com/windowsazure/features/compute/.
Windows Azure Storage. www.microsoft.com/windowsazure/features/storage/.
Apache Cassandra. cassandra.apache.org/.
Apache Cassandra API. wiki.apache.org/cassandra/API.
R. Chaiken, B. Jenkins, P. Larson, B. Ramsey, D. Shakib, S.Weaver, and J. Zhou. SCOPE: Easy and effcient parallel processing of massive datasets. In VLDB, 2008.
J. Dean and S. Ghemawat. MapReduce: Simplified Data Processing on Large Clusters. In OSDI'04: Sixth Symposium on Operating System Design and Implementation, 2004.
D. Demange, T. Jensen, and D. Pichardie. A provably correct stackless intermediate representation for java bytecode. In Proceedings of the 8th Asian conference on Programming languages and systems, APLAS'10, pp. 97-113, Berlin, Heidelberg, 2010. Springer-Verlag.
I. Dillig, T. Dillig, and A. Aiken. Sound, complete and scalable path-sensitive analysis. In Proceedings of the 2008 ACM SIGPLAN conference on Programming language design and implementation, PLDI '08, pp. 270-280, New York, NY, USA, 2008. ACM.
S. L. Garfinkel. An Evaluation of Amazon's Grid Computing Services: EC2, S3 and SQS. Technical report, Harvard University, 2007.
Apache Hadoop. hadoop.apache.org/.
C. Hammer, R. Schaade, and G. Snelting. Static path conditions for Java. In Proceedings of the third ACM SIGPLAN workshop on Programming languages and analysis for security, PLAS '08, pp. 57-66, New York, NY, USA, 2008. ACM.
S. Horwitz, T. Reps, and D. Binkley. Interprocedural slicing using dependence graphs. SIGPLAN Not., 39:229-243, Apr. 2004.
L. Hubert, N. Barr'e, F. Besson, D. Demange, T. Jensen, V. Monfort, D. Pichardie, and T. Turpin. Sawja: Static Analysis Workshop for Java. In B. Beckert and C. March'e, editors, Formal Verification of Object-Oriented Software, pp. 92-106. Springer Berlin / Heidelberg, 2011.
M. Isard, M. Budiu, Y. Yu, A. Birrell, and D. Fetterly. Dryad: Distributed Data-Parallel Programs from Sequential Building Blocks. In European Conference on Computer Systems (EuroSys). ACM, 2007.
M. Isard, V. Prabhakaran, J. Currey, U.Wieder, K. Talwar, and A. Goldberg. Quincy: Fair scheduling for distributed computing clusters. In Proceedings of 22nd ACM Symposium on Operating Systems Principles (SOSP), 2009.
S. Iyer. Map Reduce Program to group articles in Wikipedia by their GEO location. code.google.com/p/hadoop-map-reduce-examples/wiki/Wikipedia_GeoLocation, 2009.
E. Jahani, M. J. Cafarella, and C. R'e. Automatic optimization for MapReduce programs. PVLDB, 4(6):385-396, 2011.
R. Jhala and R. Majumdar. Path slicing. In Proceedings of the 2005 ACM SIGPLAN conference on Programming language design and implementation, PLDI '05, pp. 38-47, New York, NY, USA, 2005. ACM.
E. Riedel, C. Faloutsos, G. A. Gibson, and D. Nagle. Active disks for large-scale data processing. Computer, 34:68-74, Jun. 2001.
T. von Eicken. Network performance within Amazon EC2 and to Amazon S3. blog.rightscale.com/2007/10/28/network-performance-within-amazon-ec2-and-to-amazon-s3/,2007.
Y. Yu, M. Isard, D. Fetterly, M. Budiu, U. Erlingsson, P. K. Gunda, and J. Currey. DryadLINQ: A System for General-Purpose Distributed Data-Parallel Computing Using a High-Level Language. In Operating Systems Design and Implementation (OSDI). USENIX, 2008.
M. Zaharia, A. Konwinski, A. D. Joseph, R. Katz, and I. Stoica. Improving MapReduce performance in heterogeneous environments. In OSDI, 2008.
Zebra Reference Guide. pig.apache.org/docs/r0.7.0/zebra_reference.html, 2011.
IU et al, "HadoopToSQL: A MapReduce query optimizer", Published on: Apr. 2010 in Eurosys'10.
Visser et al., "Model checking programs with Java PathFinder." Published on: 2005 In SPIN, p. 27, 2005.
Visser et al., "Model checking programs with Java PathFinder." Powerpoint Tutorial Referenced in Article Published on: 2005 In SPIN, p. 27, 2005.
Nielson et al., "Principles of Program Analysis". Springer-Verlag New York, Inc., Secaucus, NJ, USA, 1999. Published on: 1999. pp. 1-70.
Nielson et al., "Principles of Program Analysis". Springer-Verlag New York, Inc., Secaucus, NJ, USA, 1999. Published on: 1999. pp. 71-140.
Nielson et al., "Principles of Program Analysis". Springer-Verlag New York, Inc., Secaucus, NJ, USA, 1999. Published on: 1999. pp. 141-210.
Nielson et al., "Principles of Program Analysis". Springer-Verlag New York, Inc., Secaucus, NJ, USA, 1999. Published on: 1999. pp. 211-279.

\* cited by examiner

GENERATION AND APPLICATION OF CORRECTNESS-ENFORCED EXECUTABLE FILTERS

COPYRIGHT NOTICE

A portion of the disclosure of this patent contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Cloud computing offers users flexible access to computing resources (e.g. in the form of virtual machines for each customer) and physical computing resources can be shared between multiple tenants. Similarly, storage resources can be shared between multiple tenants and users can purchase varying amounts of storage according to their need. Companies are now offering cloud-based analytics platforms which enable users to perform data analytics in the cloud. The data is processed by a processing sub-system and may be stored in a storage sub-system. Where these two sub-systems are not co-located, the network bandwidth between the processing sub-system and the storage sub-system is often under-provisioned and as a result can become a bottleneck for large-scale data analytics.

The embodiments described below are not limited to implementations which solve any or all of the disadvantages of known data analytics systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Methods of generating filters automatically from data processing jobs are described. In an embodiment, these filters are automatically generated from a compiled version of the data processing job using static analysis which is applied to a high-level representation of the job. The executable filter is arranged to suppress rows and/or columns within the data to which the job is applied and which do not affect the output of the job. The filters are generated by a filter generator and then stored and applied dynamically at a filtering proxy that may be co-located with the storage node that holds the data. In another embodiment, the filtered data may be cached close to a compute node which runs the job and data may be provided to the compute node from the local cache rather than from the filtering proxy.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As described above, there may be bottlenecks within a data analytics system when the storage and compute nodes (or clusters) are not co-located. Within a single cloud this causes network congestion often putting stress on a significantly oversubscribed network. When running the jobs between two public clouds or between public and private clouds the situation is even worse, as there are often ingress and egress bandwidth fees to pay, and the available network capacity between the clusters is even lower. The following description describes methods and systems for reducing the amount of data transferred between storage and compute (e.g. across bottleneck or congested links) without impacting the results of the data analytics jobs being performed. In addition to reducing congestion at the bottleneck, this yields a reduction in execution time and reduces costs when the data traverses cloud provider boundaries.

Figure 1:
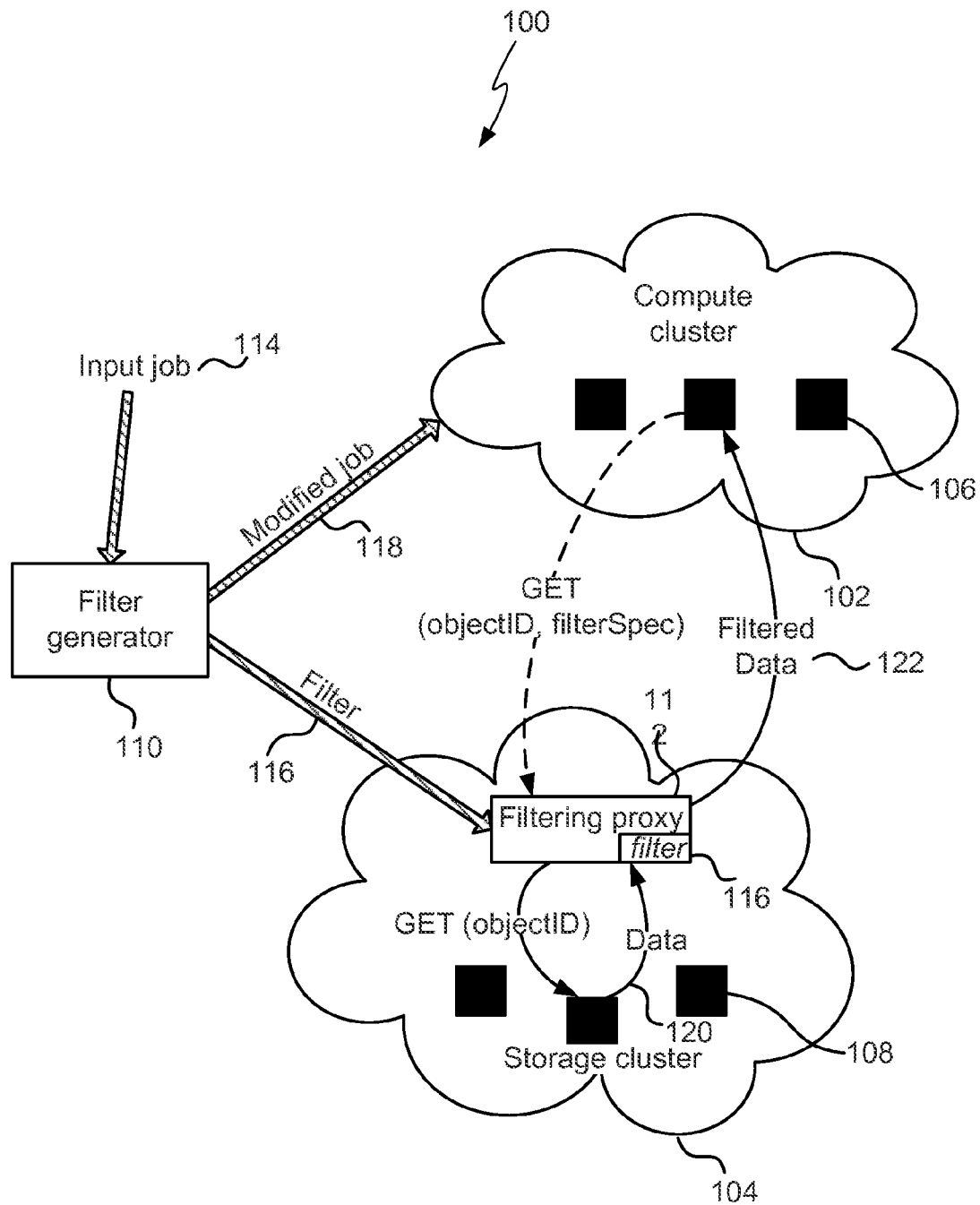
FIG. 1 is a schematic diagram of a system architecture which reduces traffic between storage and compute infrastructures for data analytics jobs.

FIG. 1 is a schematic diagram of a system architecture 100 which reduces traffic between storage and compute nodes (or infrastructures) for data analytics jobs (e.g. Hadoop MapReduce jobs) by automatically generating and then applying filters which transparently filter data, as can be described with reference to the flow diagrams in FIGS. 2 and 3. The system architecture 100 shown in FIG. 1 comprises a compute cluster 102 (which may also be referred to as a processing cluster) and a storage cluster 104, where each cluster 102, 104 comprises a number of individual machines 106, 108. The system further comprises a filter generator 110 (which may also be referred to as a 'job analyzer') and a filtering proxy 112. The filter generator 110 automatically generates job-specific filters from static analysis of the compiled job (e.g. static analysis of the job's bytecode). The filtering proxy 112 applies the filters which have been generated to data read from storage and the filters remove input rows and/or column values within rows. This significantly reduces the number of bytes transferred (e.g. by a factor of >5 for some example jobs) and correspondingly reduces any egress bandwidth charges and overall execution time by similar factors.

The filter generator 110 may be located anywhere in the system, for example it may be located in a programmer's local machine or co-located with the filtering proxy. Although the filtering proxy 112 is shown within the storage cluster 104, it may also be located anywhere in the system (including in the network between the storage and compute clusters 104, 102); however, the system operates most efficiently if the filtering proxy 112 is upstream of a bottleneck link, for example if it is located close to the storage cluster 104 or in a location with very good network links (i.e. high bandwidth links) to the storage cluster 104. In an example, the filtering proxy may be located in a storage node 108 or within the same data center as the storage node holding the data, where the computation is performed in a different data center. The filtering proxy 112 may be run by the storage or cloud provider or by the user and the filter generator 110 may be run by the same entity or by a different entity.

It will be appreciated that although FIG. 1 shows a single storage cluster 104 and a single compute cluster 102, a system may comprise more than one of these clusters. Furthermore there may be multiple filtering proxies 112 and in some examples there may be more than one filter generator 110.

In an example usage scenario, a user collects data (e.g. logs) relating to their business and stores the data in the storage cluster 104. Later on, the user uses the compute cluster 102 to perform data analytics over this data (e.g. to identify trends, compute statistics etc). In this architecture, the data which is to be used (when performing the data analytics) is transferred from the storage cluster 104 to the compute cluster 102 in order for the processing to commence. Typically, the network that connects the two clusters has limited resources (as described above).

Figure 2:
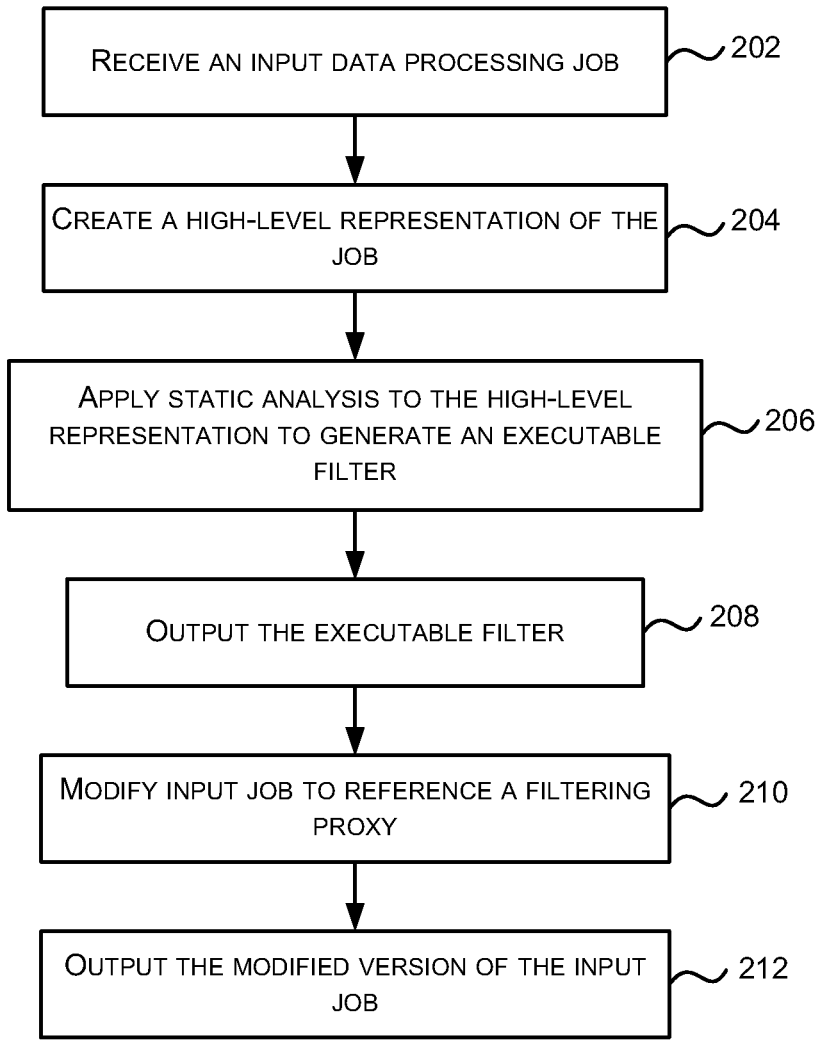
FIG. 2 is a flow diagram of an example method of operation of a filter generator.

FIG. 2 is a flow diagram of an example method of operation of the filter generator 110 which examines the code and identifies the conditions under which an input row and/or columns within that row will cause the compute node running the job to generate output. As shown in FIG. 2, the filter generator 110 receives an input data processing job 114 (block 202) which has already been compiled by a user (e.g. the job may comprise a compiled Java package). The received input job is processed (e.g. parsed) to create a high-level representation of the job (block 204). Static analysis is then applied to the high-level representation (which may also be referred to as 'intermediate form' of the job) to generate an executable filter 116 (block 206) which suppresses parts of the data which do not result in any output at all from the data analytics job when run on the data. This static analysis is described in more detail below and the parts of the data which are suppressed may comprise entire rows and/or portions of a row (e.g. one or more column entries within a row). In some examples, more than one executable filter 116 may be generated and any filters which are generated (in block 206) are then output (block 208), e.g. to the filtering proxy 112. Where more than one executable filter 116 is generated, these filters may, for example, comprise a row filter and a column filter or multiple stages of a filter. In another example, where a job processes multiple types of input data, a separate filter may be generated for each type of input data.

In addition to outputting the executable filter 116 (in block 206), the filter generator 110 may also output a modified version of the input job 118 (block 212), e.g. to the compute cluster 102 or other computing entity. In such examples, the input job is modified to reference the filtering proxy 112 in addition to, or instead of, the actual data storage location, such as a storage node 108 (block 210) and this is described in more detail below. In a variation of the method shown in FIG. 2, the filter generator 110 may embed other information within the modified input job (e.g. within the file name). This extra information helps the filtering proxy to select which filter to apply on the data and this is described in more detail below with reference to FIG. 3.

As described above, the filter generator 110 may generate and output one or more executable filters. Where multiple filters are generated these may, for example, comprise individual stages of a multi-stage filter such that the filters can be run in sequence or in parallel (e.g. on different data sets). Use of multiple filters may reduce the load of any part of the filter and may enable coarser filters to be pushed into more resource constrained parts of the system (e.g. running on disk in a storage node) with subsequent finer filter stages being implemented elsewhere.

Figure 3:
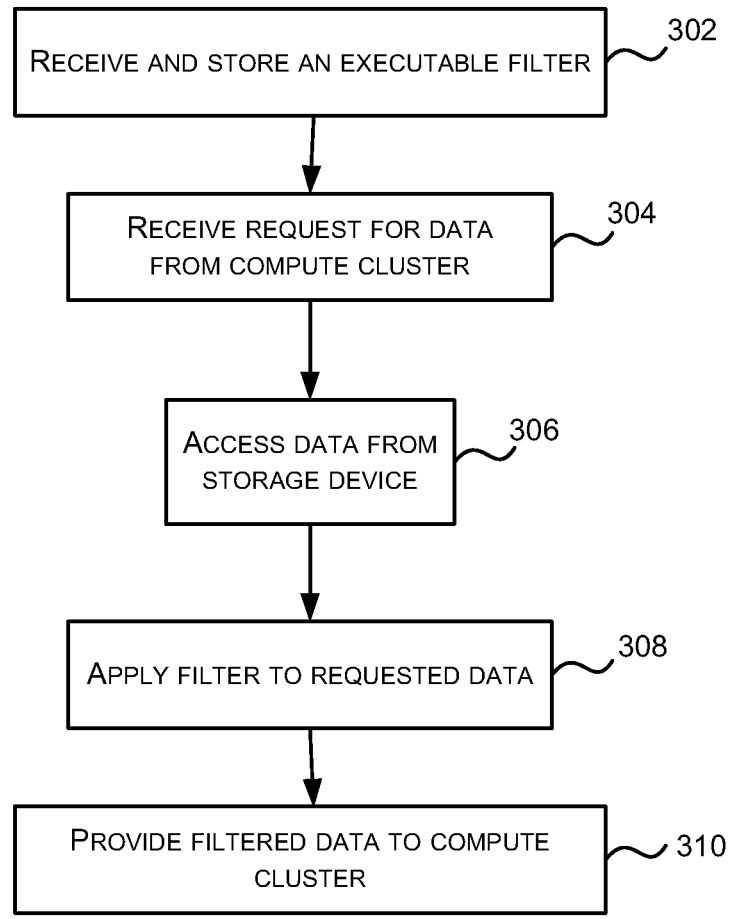
FIG. 3 is a flow diagram of an example method of operation of a filtering proxy.

FIG. 3 is a flow diagram of an example method of operation of the filtering proxy 112. The filtering proxy 112 receives and stores an executable filter 116 (block 302) which has been generated by a filter generator 110 (e.g. as output in block 208 in FIG. 2). In response to receiving a request for data from the compute cluster 102 (block 304) where the request identifies the data and a filter (or filter specification) in some way, the filtering proxy 112 accesses the identified data 120 from a storage device 108 within the cluster 104 (block 306). The filtering proxy 112 identifies a filter based on information included in the request received and then applies the identified filter (e.g. filter 116) to the accessed data 122 (block 308) to generate filtered data 122. As described above, information which identifies the filter specification to be used may be encoded within the filename of the modified input job (which is generated by the filter generator 110 in block 210 of FIG. 2). Alternatively, there may be another form of signaling which is received by the filtering proxy 112 and which pairs input data with one or more filters. Having generated the filtered data (in block 308), the filtering proxy 112 then provides this filtered data 122 to the compute cluster 102 for use in processing the job (block 310).

The filter generation process (as shown in FIG. 2) may be considered a pre-processing step. As a result of the use of a filtering proxy 112 within the architecture, use of the methods and filters as described herein does not require any changes to the compute cluster 102 or to the software framework (such as Hadoop) used to perform the computations. The use of a filtering proxy 112 also allows flexibility in filter placement as described above. For example, in a public cloud scenario the cloud provider could run filtering proxies on or near the storage servers; in the public/private and public/public cross-cloud scenarios, the user could additionally run filtering proxies in a virtual machine in a compute cluster in the same data center as the storage. These examples are described in more detail below with reference to FIG. 4. It will also be appreciated that in some embodiments, a user may generate filters and provide them to the filtering proxy 112, such that a filter generator 110 is not required. In such an embodiment, an entity may be provided instead of a filter generator which does not generate filters but does generate modified input jobs (as in blocks 210-212 of FIG. 2).

As described above, the result of applying the input job 114 or the modified version of the input job 118 to the filtered data 122 is exactly the same as the result of applying either job 114, 118 to the original, unfiltered data 120. As a result, the filtering process (in block 308) is described as transparent (to both the compute and storage nodes) and free of side effects. The filters generated are conservative in the sense that they do not filter out data that would cause a change in the output of the processing job (e.g. the mapper's output, for MapReduce jobs). The filters may have false positives (resulting in not filtering data elements which do not affect the output) but not false negatives.

The filtering process described herein operates dynamically (or 'online') as data is streamed from the data storage node 108 to the compute cluster 102. There is no need to pre-filter the data and store any derivative of the data at the storage cluster, which saves computing effort and storage space. As the filtering process described herein is transparent to the compute cluster and software framework used to perform jobs (e.g. Hadoop), the filters may be dynamically inserted or removed at any time during a job and there is no overhead when they are disabled. This means that filtering can be employed on a best-effort or on demand basis, for example, the filtering may be stopped or started in response to a trigger condition such as the availability of resources (e.g. filters may be disabled when there is insufficient processing capacity on the storage server) or based on anything else (e.g. load, costs, etc). Furthermore, as the methods are online, they do not cause additional overheads when fresh data is appended.

As the filters which are generated (in block 206 of FIG. 2) are stateless and free of side effects, they are safe to run on storage servers, unlike the jobs, for example, as map code which forms part of a job, can contain arbitrary operations. Filters from different users can be run simultaneously in the same address space.

The filtering generation (or creation) process described herein is implicit (rather than explicit) in that it does not require a programmer (or user, who writes the original input job) to include explicit filtering predicates within the original job. The implicit approach which is used is much more flexible than explicit approaches in which the application is tied to a specific interface to the storage (e.g. SQL, Cassandra, etc). Explicit approaches are also not well suited for free-format or semi-structured text files which have to be parsed in an application-specific manner. The methods described herein allow programmers to embed application-specific column parsing logic or arbitrary code in the job (e.g. in the mapper), without imposing any additional programmer burden such as hand-annotating the code with filtering predicates. Instead, as described herein, filters are inferred automatically from a static analysis of the application bytecode. The filters generated can also encode arbitrary Boolean functions over input rows, which allows them to handle mappers which perform complex processing of input fields (e.g. string manipulation).

The original data processing job may be written by a user in a high-level language such as C# or Java and this is then compiled to generate an input data processing job in bytecode and it is this bytecode which is received by the filter generator 110 in block 202 of FIG. 2. As the method of filter generation shown in FIG. 2 takes as input the binary bytecode of the submitted job, rather than the source code, this means that a provider (e.g. a cloud provider) can use the methods described herein without requiring source code. It will be appreciated, however, that in variations of the methods described herein, the source code may be received by the filter generator 110 (e.g. in block 202 of FIG. 2) and in which case it may not be necessary to create a high-level representation of the job (i.e. block 204 may be omitted) and the static analysis may be applied to the source code.

An example of an original processing job as written by a user is given below. This example is a fragment of a GeoLocation map method.

```
1     . . . // class and field declarations
2     public void map( LongWritable key , Text value ,
3         OutputCollector <Text , Text >outputCollector ,
4         Reporter reporter ) throws IOException {
5
6         String dataRow = value . toString ( );
7         StringTokenizer dataTokenizer =
8             new StringTokenizer ( dataRow , "\t");
9         String artName = dataTokenizer . nextToken ( );
10        String pointTyp = dataTokenizer . nextToken ( );
11        String geoPoint = dataTokenizer . nextToken ( );
12
13        if ( GEO_RSS_URI . equals ( pointTyp )) {
14            StringTokenizer st =
15                new StringTokenizer ( geoPoint , " ");
16        String strLat = st. nextToken ( );
17        String strLong = st. nextToken ( );
18        double lat = Double . parseDouble ( strLat );
19        double lang = Double . parseDouble( strLong );
20        long roundedLat = Math . round ( lat );
21        long roundedLong = Math . round ( lang );
22        String locationKey = . . .
23        String locationName = . . .
24        locationName = . . .
25        geoLocationKey . set ( locationKey );
26        geoLocationName . set ( locationName );
27        outputCollector . collect ( geoLocationKey ,
28            geoLocationName );
29    } }
```

The input format of this job is text, with each line of data corresponding to a row and tab characters separating columns within the row. Each row contains a type column which determines how the rest of the row is interpreted; depending on the type, rows have either 3 or 4 columns in total. Only one of the two row types in the input data is relevant to the GeoLocation application. About 25% of the rows are of the relevant type, comprising 21% of the bytes. In this example, all the columns of the relevant rows are processed and hence there is no column selectivity. This means that only a row filter (or set of row filters) is generated and used.

As described above, a high-level representation (or intermediate form) is created (in block 204 of FIG. 2) from the received input job. This may be done using SAWJA (as described in 'Sawja: Static Analysis Workshop for Java' by Hubert et al, published in Formal Verification of Object-Oriented Software, pages 92-106. Springer Berlin/Heidelberg, 2011) which is a tool which provides a high-level stackless representation of Java bytecode and infrastructure for designing custom program analyses. For .Net apps (e.g. from C#) the Phoenix compiler framework may be used to create the high-level representation. For other forms of input job which are in a low-level representation, alternative tools may be used to create the high-level representation (in block 204).

Any form of static analysis may be used (in block 206 of FIG. 2) to generate an executable filter by taking the high-level representation of the byte code and extracting parts of the input job and detailed examples are described below for generation of a row filter and a column filter (which may also be referred to as a 'column selector'). The row and column filters which are generated using static analysis are specific to a particular input job. A row filter takes a single row of data as input and returns true or false, indicating whether the row must be passed on to the compute node/cluster or not. A column filter or selector takes a single row as input and returns a modified version of the row with one or more columns set to a null value, such as an empty string in the case of text based rows. Thus the methods described herein can infer and exploit both row selectivity and column selectivity in input jobs, such as Hadoop jobs.

In an example of the static analysis (in block 206 of FIG. 2), the analysis tags the instructions of the high-level representation that read and process (i.e. "use") input data and those that schedule data for further processing or output the data back to storage in order to identify the input and output commands of the stages of a data analytics job. These identified commands are then used to compute a set of 'relevant' instructions using data-flow analysis and this is described in more detail below. In a variation, the input and output commands may instead be identified by introducing new commands into the high-level representation (created in block 204 of FIG. 2) that express operations of input and output.

As described above, the filter generator 110 generates one or more executable filters (in block 206 of FIG. 2). The term 'executable filter' is used herein to refer to a filter which contains encoded instructions which can be run on a computing-based device to cause it to perform tasks according to the encoded instructions. This term encompasses filters in the form of machine code instructions and bytecode and is distinct from a filter specified in terms of a logical list or set of symbolic conditions. The executable filter may alternatively be referred to as a program to highlight the fact that it does not have to be in the form of machine instructions but could alternatively comprise bytecode (e.g. Java bytecode). Such an executable filter (or program) does not require any special logic infrastructure which makes it very portable and more expressible. In some implementations, the executable filter may be implemented in hardware (e.g. on an FPGA or an onboard processor in a storage node such as an ARM processor) and as with the earlier examples the format of the executable filter is dependent upon the target environment (e.g. Java bytecode for execution on a Java virtual machine, ARM's machine format for execution on an ARM processor, etc).

As described above, the filter generator 110 may modify the control job object (in block 210 of FIG. 2) to redirect the I/O via the filtering proxy 112. This means that the modified job (output in block 212) can run on any unmodified compute cluster (e.g. Amazon's Elastic MapReduce). Where a job (e.g. a Hadoop job) accesses storage (e.g. within storage cluster 104) using URIs (uniform resource identifiers), the filter generator 110 may automatically modify these URIs to point to the filtering proxy 112 (in block 210). Additionally the filter generator 110 may embed a 'filter specification' in each URI, which is interpreted by the filtering proxy 112 and identifies the filter which may be used on the data (in block 308 of FIG. 3).

In an example implementation, the filtering proxy 112 works with Amazon's S3 storage and can also be configured to work with local storage. The filtering proxy 112 exposes the public S3 REST API to its client. S3 objects are named by a <bucketID;objectID> tuple. The Hadoop framework, which is used in this example implementation, wraps this in a thin "Hadoop S3 native file system" shim layer; however this layer simply uses path names as S3 object IDs. In such an implementation, the modified jobs 118 embed a filter specification in their path names, which is then passed unmodified to the filtering proxy inside the object ID. The filter specification is interpreted by the filtering proxy 112 and is used to apply the appropriate filters; the filtering proxy then removes the filter specification and passes the request on to the underlying S3 storage. This allows the methods described herein to be used without modifications either to the compute framework (e.g. Hadoop) or to the storage nodes (e.g. S3 servers). Although Amazon's S3 storage is used by way of example, in another example, Windows® Azure™ Storage may be used.

Figure 4:
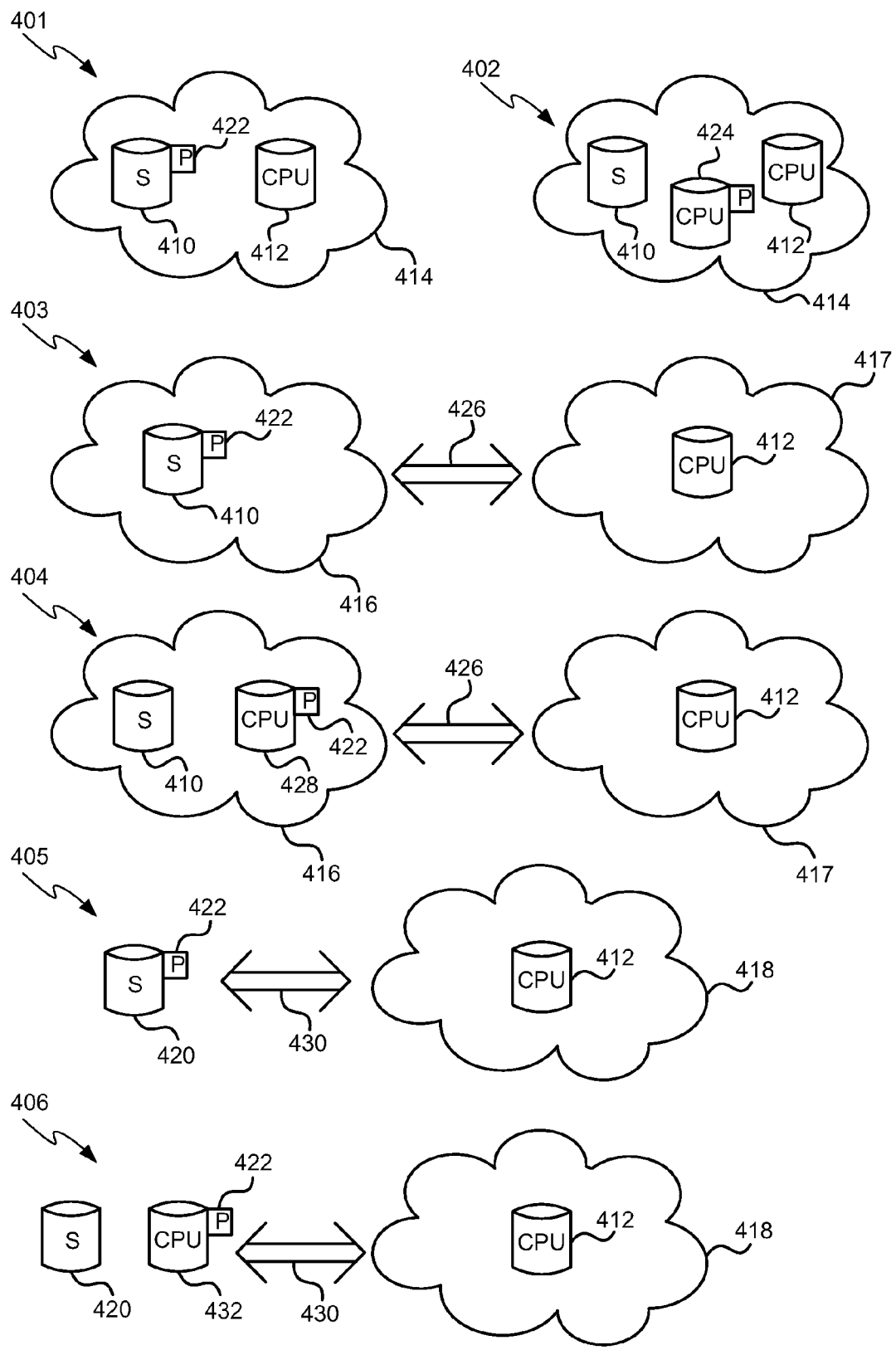
FIG. 4 is a schematic diagram showing a number of different cloud-based scenarios where the methods described herein may be used.

There are many different scenarios where the methods described herein may be used and various examples 401-406 are shown in FIG. 4. In the first two examples 401-402 the storage node 410 and the compute node 412 are within the same cloud 414. In next two examples 403-404, the storage and compute nodes 410, 412 are in different clouds 416-417 and in the final two examples 405-406, the compute node 412 is in a cloud 418 but local (non-cloud-based) storage 420 is used. It will be appreciated that these examples, which are described in more detail below, show just a subset of the possible implementation scenarios (e.g. another scenario may use cloud-based storage and local computing).

The first two examples 401-402 show scenarios in which a single organization provides a multi-tenant cloud infrastructure with both storage 410 and compute 412, e.g. Amazon EC2 (compute) and Amazon S3 (storage) or Windows® Azure™ Compute and Windows® Azure™ Storage. The cloud 414 is therefore a public cloud. Most public cloud providers, e.g. Amazon and Microsoft® Windows® Azure™, internally separate storage 410 from compute 412 for many reasons, including performance isolation and security. This separation is also driven by the fact that the storage can be accessed by services running outside the cloud as well as services running inside the cloud. When storage 410 and compute 412 are not co-located the bottleneck resource is often the network bandwidth between them. Networks used in these cloud infrastructures are often oversubscribed, which makes the bandwidth valuable. Hence reducing storage-to-compute network traffic using the methods described herein can improve the transfer times between storage and compute servers as well as overall utilization of the data center.

In the environment of examples 401-402, the cloud provider automatically generates and deploys filters using the methods described herein when the user submits a compute job. In the first example 401, the executable filters run on the storage server 410 (the filtering proxy 422 is shown attached to the storage server 410 in example 401 in FIG. 4). Alternatively, as shown in the second example 402, the executable filters could run on a compute server 424 in the same rack as the storage server 410. Both options require the cloud provider to support the methods described herein.

In next two examples 403-404, the storage and compute nodes 410, 412 are in different clouds 416-417 and these examples may represent so called 'public-private cloud' scenarios in which one of the clouds 416-417 is a public cloud and the other is a private cloud, or public-public scenarios in which both clouds are public clouds but each cloud is operated/owned by a different provider. These two situations are described separately below.

The public-private cloud arrangement is an increasingly popular hybrid option where computation is performed on a private cluster but data is stored in a public cloud, or conversely data is stored on a private server but the elastic properties of a public compute cloud are exploited to enable compute intensive processing of the data. In these cases the bandwidth between the private and public cloud (indicated by arrow 426) is the bottleneck resource, as providers charge ingress and egress bandwidth fees per GB transferred to and from the public cloud.

When the storage 410 is in the private cloud (i.e. when cloud 416 is a private cloud), then the executable filters generated using the methods described herein can be run in that same cloud, at no additional cost and the filtering proxy 422 may be implemented on the storage server 410 as shown in example 403. When the storage is in the public cloud (i.e. when cloud 416 is a public cloud), the cloud provider (e.g. S3) could natively support third-party executable filters (as generated using the methods described herein) running on the storage servers 410, as shown in example 403. However, if this is not supported, users can still run such executable filters in a virtual machine (VM) on a compute cluster 428 close to the storage (e.g. an EC2 instance), as shown in example 404. Such a filtering proxy 422 will still have better (and free) connectivity to the storage 410 compared to accessing it over the wide area. Based on current charging models, it can be shown that the savings in egress bandwidth charges outweigh the dollar cost of a filtering VM instance. Additionally, the isolation properties of the executable filters described herein make it possible for multiple users to safely share a single filtering VM and thus reduce this cost.

In a public-public cloud scenario, compute 412 and storage 410 are both in public clouds (i.e. in this scenario both clouds 416-417 are public clouds), but they are owned by two different operators, e.g. Amazon EC2 and Microsoft® Azure Storage. This could, for example, occur due to pricing or regulatory constraints about where data and compute is performed, or it could be because a job requires a public data set that is stored in a different cloud. In this case, as with the hybrid private-public cloud, the executable filters could be run in the storage infrastructure if supported natively (as shown in example 403), but if not the filtering proxy 422 may be run on a co-located compute infrastructure 428 (as shown in example 404).

In the final two examples 405-406 in FIG. 4, the compute node 412 is in a cloud 418 but local (non-cloud-based) storage 420 is used. In this case, the bottleneck is the access to the public cloud 418 (as indicated by arrow 430) including any ingress/egress fees charged on a per GB basis by the cloud provider. To reduce the amount of data transferred the user can run the executable filters on the local storage server 420 (as in example 405). Alternatively the user could run the executable filters on a local processing node 432 which is separate from the storage server 420 (as in example 406).

As well as many different implementation scenarios (as shown in FIG. 4) there are very many different types of data processing jobs from which executable filters may be automatically generated (using the methods described herein) such that the data transfer between storage cluster 104 and compute cluster 102 is reduced. Three example Hadoop jobs are described below which demonstrate the different types of filtering that may be applied as a result of automatically generating one or more executable filters using the methods described herein and also provide some indication of the reduction in data transfer from storage cluster 104 to compute cluster 102 that can be achieved. Additional results are provided later.

A fragment of one example Hadoop job, a GeoLocation map job, has been included above. GeoLocation is a publicly available application which groups Wikipedia articles by their geographical location. The input data is based on a publicly available data set which has 1.11 million rows and in total the data set is 90 MB. As described above, only one of the two row types in the input data is relevant to the GeoLocation application (about 25% of the rows comprising 21% of the bytes).

Two further example Hadoop jobs are FindUserUsage and ComputeIoVolumes. These two jobs are based on processing large system logs and Hadoop is a good fit for text log processing and is frequently used for that purpose. The use of Java gives enough flexibility, for example, to parse semi-structured text rows with variable lengths and numbers of columns. At the same time, the simplicity and scalability of the MapReduce model allows large logs to be processed over many machines in parallel.

The specific example described herein uses logs from a large compute/storage platform comprising tens of thousands of servers. Users issue tasks to the system, which spawn processes on multiple servers, and consume CPU and other resources on each server. The logs capture information about CPU, I/O, and other resource usage on these machines. They are periodically processed to gather statistics about utilization, identify heavy users, etc. In this system, there are two logs: the process log and the activity log. The process log has one row per process, with information about its task, user and total execution time. Each row has 18 columns. The process log accumulates 126 M rows/day, with an average row size of 325 bytes, resulting in 41 GB/day of data. The activity log records finer-grained information about the actions performed by each process, such as reading and writing files. The first column of each activity row is a type column indicating the type of activity. These rows have 10 columns, and the log accumulates at 53 GB/day.

The FindUserUsage job is a top-k query: it identifies the top k users by total process execution time. This requires only the process log and not the activity log. It requires only 2 of the 18 columns (61 of 325 bytes on average) in each row of the process log(user ID and execution time). However, every row must be processed to correctly identify the top k users. Thus this job has column selectivity but no row selectivity.

The ComputeIoVolumes job processes the log to compute a distribution across tasks of the amount of input and intermediate data read by the task from storage. This requires correlating rows representing I/O read requests from the activity log, with the task and process information in the process log. From the process log, rows corresponding to failed and killed processes are skipped, which results in only 69% of the rows being relevant. For these rows, only 4 of the 18 columns are used in the computation. From the activity log, only rows of type "I/O read" are relevant (25% of the total), and only 4 of the 10 columns are used. Thus this job has both row and column selectivity on both its inputs.

The GeoLocation map job described above can be used in describing an example method of generating a row filter. Given a map method with signature:

```
public void map ( LongWritable key ,
    Text value ,
    OutputCollector outputCollector ,
    Reporter reporter )
``` the filter generator 110 generates a method:

```
public boolean filter ( LongWritable key ,
    Text value ,
    OutputCollector outputCollector ,
    Reporter reporter )
``` filter is a "stripped-down" version of map, retaining only those instructions and execution paths from map that determine whether or not a given invocation will produce an output. Instructions that only determine the content of the output are not included in the filter.

A fragment of the GeoLocation map method is given above. The method tokenizes the input value (line 7), then skips 3 tokens ahead (line 9-11), then examines if the GEO_RSS_URI static field is equal to the third token (line 13). If the condition is true, more processing follows (line 14-26) and some value is output on outputCollector.

The following listing shows the filter generated by the methods described herein for this mapper:

```
1   public boolean filter ( LongWritable bcvar1 ,
2       Text bcvar2 ,
3       OutputCollector bcvar3 , Reporter bcvar4 ) {
4
5       boolean cond = false ;
6       String bcvar5 = bcvar2 . toString ( );
7       String irvar0 = "\t";
8       StringTokenizer bcvar6 =
9           new StringTokenizer ( bcvar5 , irvar0 );
10      String bcvar7 = bcvar6 . nextToken ( );
11      String bcvar8 = bcvar6 . nextToken ( );
12      boolean irvar0_1 = GEO_RSS_URI . equals ( bcvar8 );
13
14      cond = (( irvar0_1 ?1:0) != 0);
15      if (! cond ) return false ;
16      return true ;
17  }
```

Similarly to the map method, the filter above tokenizes the input (line 8). It then compares the second token to the static field GEO_RSS_URI (line 12). Variable bcvar8 here corresponds to pointTyp in map. This test exactly determines whether or not map would have produced output, and hence filter simply returns this Boolean. In more complex cases, it may not be possible to determine exactly, for all execution paths, whether output would be produced. For execution paths where the analysis is not exact, the filter conservatively returns true. Thus the filter might have false positives but never false negatives.

Comparison of map and filter reveals two interesting details. First, while map extracted three tokens from the input, filter only extracted two. The third token does not determine whether or not output is produced, although it does affect the value of the output. The static analysis detects this and omits the extraction of the third token from filter. Second, map does substantial processing (line 14-26) before producing the output. All these instructions are omitted from the filter. This is again because these instructions affect the output value but are irrelevant to computing the output condition. The filter generator correctly detects this and omits these instructions.

Figure 5:
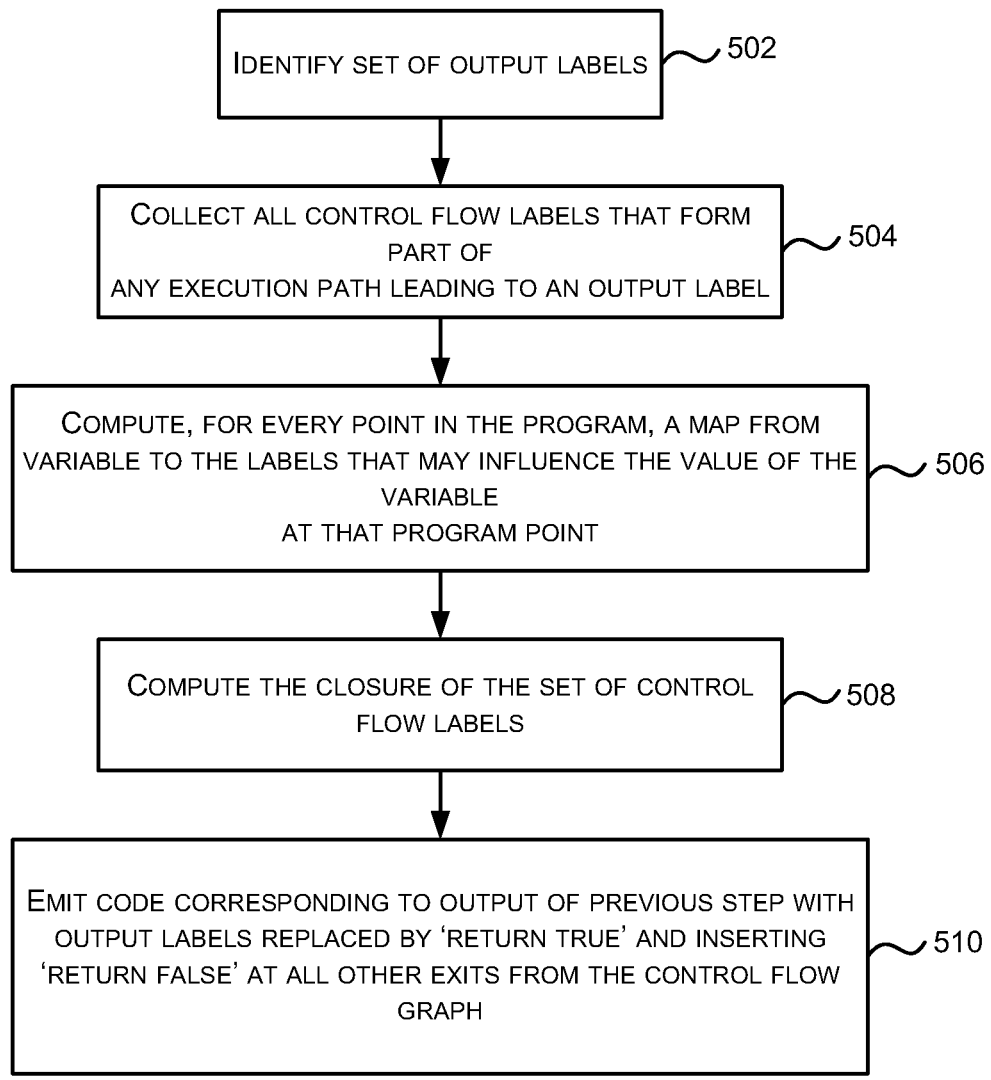
FIG. 5 is a flow diagram of a more detailed example method of generating a row filter.

At a high level, row filters may be generated by considering all control flow paths that lead to an output statement, and then finding all instructions that influence conditional branch decisions on those paths. FIG. 5 is a flow diagram of a more detailed example method of generating a row filter (which may form all or part of block 206 of FIG. 2) and which is implemented by a filter generator 110. As shown in FIG. 5, a set of output labels OutputLabelSet is identified (block 502). A label is simply a unique program point, with its associated instruction. An output label is a call to one of a small set of Hadoop methods that are provided for mappers to generate output, e.g. OutputCollector.collect or Context.out.

Figure 6:
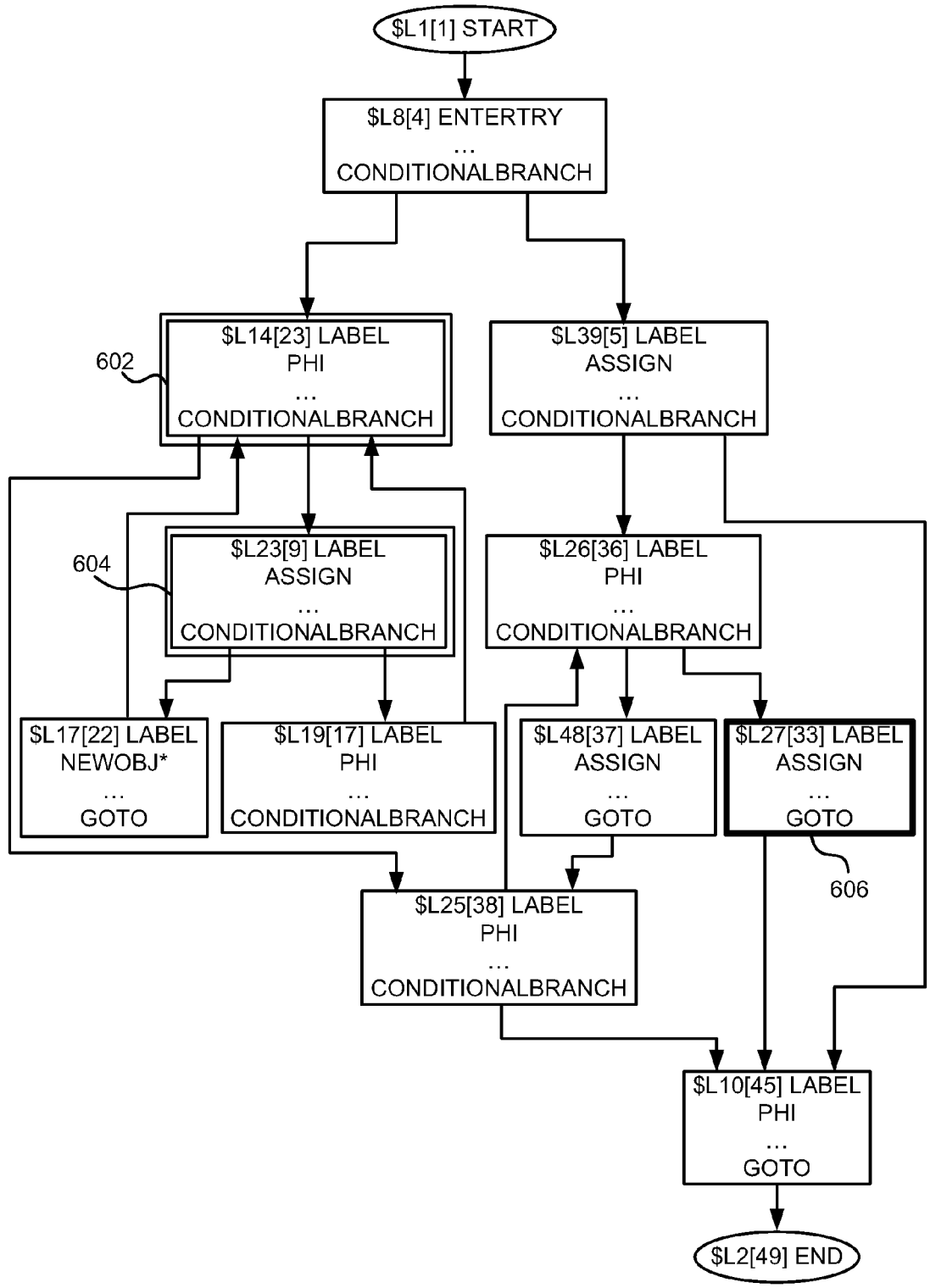
FIG. 6 shows an example of a Control Flow Graph.

Next, all control flow labels (branch instructions, e.g. gotos and conditionals) that form part of any execution path leading to an output label are collected (block 504). We call this the RelevantCtflSet. It contains both conditional and unconditional branches. FIG. 6 shows an example of a Control Flow Graph (CFG). This representation is the same as the high-level representation of a job (as generated in block 204 of FIG. 2) with the addition of edges that describe the branch instructions that exist in the program. The CFG shown in FIG. 6 has been annotated to identify the location of reads 602, 604 (shown with a double outline) and writes 606 (shown with a thick black outline). The execution of the program can follow any of the edges of the CFG, but the conditions which are extracted are those that lead from read nodes 602, 604 to write nodes 606.

Having identified the RelevantCtflSet, the next step is a label-flow analysis and this may be implemented using standard forward analysis (e.g. as described in 'Principles of Program Analysis' by F. Nielson et al and published by Springer-Verlag New York, Inc., Secaucus, N.J., USA, 1999) inside the analysis framework provided by SAWJA (see earlier reference). For every point in the program, a map from a variable to the labels that may influence the value of the variable at that program point is computed (block 506). Hence this step returns a map from labels, to a map from variables to label sets:

FlowMap: Label ↦ (Var ↦ LabelSet)

The closure of the RelevantCtflSet is then computed (block 508). For every instruction in RelevantCtflSet, all the labels that may affect the value that is used in that control flow instruction to perform a jump are accumulated.

$$\text{RelevantSet} = \text{RelevantCtflSet}$$
$$\cup \ \{\ell | \ \exists \ell_c, \exists x, \ell_c \in \text{RelevantCtflSet}$$
$$\wedge x \in \textit{vars}(\textit{instr}(\ell_c))$$
$$\wedge \ell \in \text{FlowMap}(\ell_c)(x)\}$$

Here vars(instr($l_c$)) is the set of variables referenced in the instruction at label $l_c$. Since control flow instructions only are considered here, it is the set of variables used in the branch conditional (if any).

Code is then emitted corresponding to RelevantSet, replacing output labels with return true statements, and inserting return false at all other exits from the control flow graph (block 510). This code may then be compiled (e.g. using a standard Java compiler) to create an executable filter. Alternatively, Java bytecode may be generated directly within this method step (within block 510).

In the row filtering methods described above, each input record is either suppressed entirely or passed unmodified to the computation. In addition to, or instead of, row filtering individual columns within rows may also be suppressed. For example, in a top-k query (such as FindUserUsage described above) all rows must be examined to generate the output, but only a subset of the columns are relevant. Suppressing the irrelevant column values saves bandwidth without having any effect on correctness. As a simple example, consider a mapper which is given a comma-separated input row "alice, usa,25". If the mapper only uses the first and last columns and ignores the second, the input record can be safely transformed to the value "alice,,25" without changing the program's behavior. When suppressing columns, the column separators are retained which allows the mapper to parse the input row exactly as if the irrelevant columns had not been suppressed. This means that filtered and unfiltered input data can be mixed transparently in a single execution. Some mappers use regular expressions to tokenize the input, e.g., multiple consecutive commas could count as a single separator. In this case, the string "alice,,25" would not be a correct filter output, but the string "alice,?,25" would be correct.

For each map method, the filter generator 110 produces a select method:

```
public String select ( LongWritable key ,
    Text value ,
    OutputCollector outputCollector ,
    Reporter reporter )
```

This method is called by the filtering proxy to transform an input row into a shorter but equivalent (as far as processing is concerned) text record. Column filtering can (but need not) be combined with row filtering. Where the two are combined, the filtering proxy 112 first calls filter and then calls select for those inputs for which filter returns true.

For the GeoLocation map function given earlier, the following column selector (or column filter) may be generated.

```
1    public String select ( LongWritable bcvar1 ,
2      Text bcvar2 ,
3      OutputCollector cvar3 , Reporter bcvar4 ) {
4      String bcvar5 = bcvar2 . toString ( );
5      String irvar0 = "\t";
6      StringTokenizer bcvar6
7        = StringTokenizer ( bcvar5 , irvar0 );
8      int i = 0;
9      String filler = computeFiller ( irvar0 );
10     StringBuilder out = new StringBuilder ( );
11     String curr , aux ;
12     while ( bcvar6 . hasMoreTokens ( )) {
13       curr = bcvar6 . nextToken ( );
14       if (i ==2 | | i ==1 | | i ==0) {
15         aux = curr ;
16       } else {
17         aux = filler ;
18       };
19       if ( bcvar6 . hasMoreTokens ( )) {
20         out . append (aux ). append ( irvar0 );
21       }
22       else {
23         out . append (aux );
24       }
25       i ++;
26     }
27     return out. toString ( ); }
```

The map function tokenizes its input and only examines the first three tokens of the input. The column selector code captures this by retaining only the first three tokens. It tokenizes the input string, and builds a new string from the generated tokens, replacing all unused tokens with a filler value, which may, for example, be either an empty string or a single character. The filler value is computed dynamically based on the separator used for tokenization, to ensure that the results are correct when the string is again tokenized by the map function. The string output from the column selector is then appended to the filter output and sent back to the mapper in place of the original text.

The static analysis for column selection (within block 206 of FIG. 2) is different from that used for row filtering. In Hadoop, mappers split each row (record) into columns (fields) in an application-specific manner. This is very flexible: it allows for different rows in the same file to have different numbers of columns. Mappers can also split the row into columns in different ways, e.g., using String. split( ), or a tokenization library, or a regular expression matcher. This flexibility makes correctly removing irrelevant substrings challenging. In order to address this, the analysis described herein is designed in a way that accommodates common patterns of input column usage, and conservatively performs no input column selection at all for usage patterns that lie outside this domain.

Figure 7:
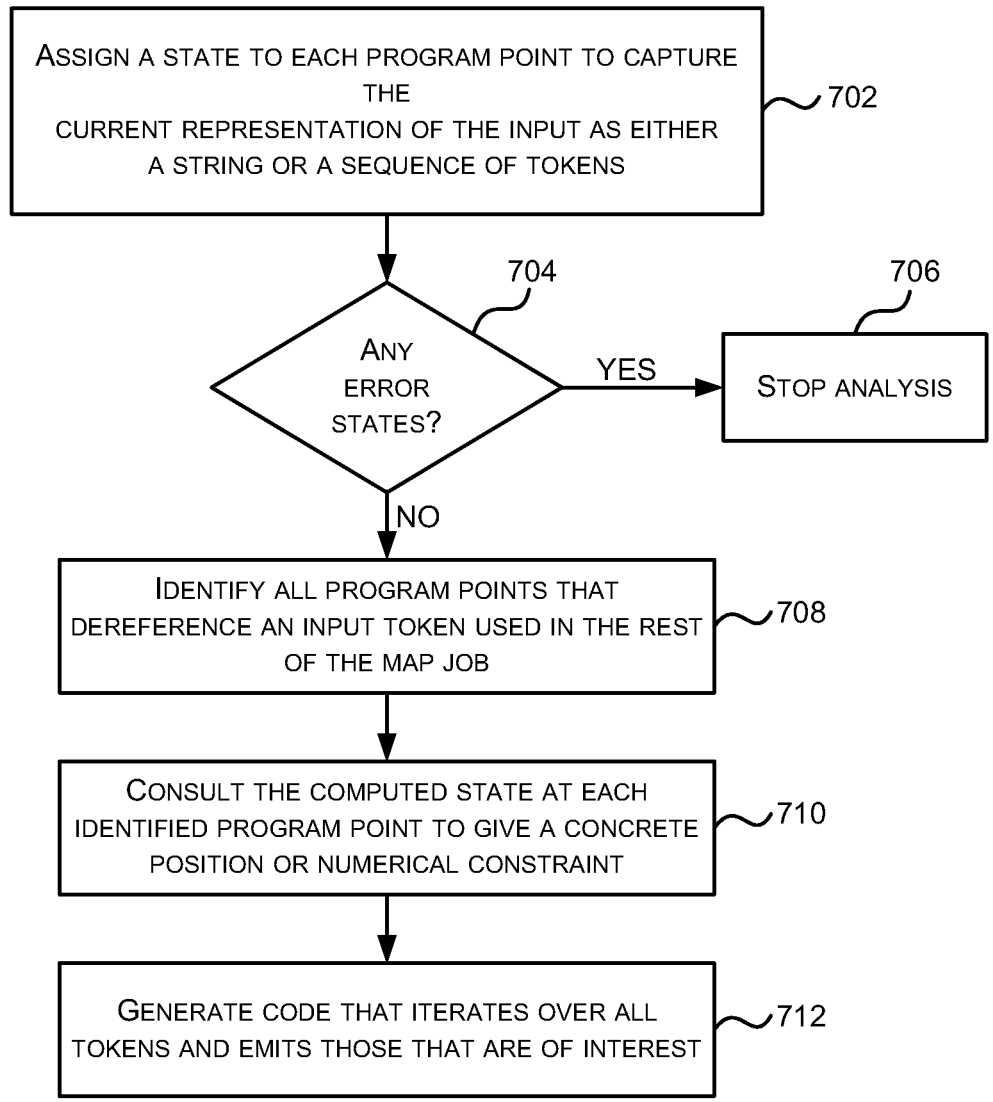
FIG. 7 is a flow diagram of a more detailed example method of generating a column filter.

FIG. 7 is a flow diagram of a more detailed example method of generating a column filter (which may form all or part of block 206 of FIG. 2) and which is implemented by a filter generator 110 and this method may be described with reference to FIG. 8 which is a schematic diagram of an example of a transition system for column selector analysis. This example is for detecting one pattern of column selection and similar detectors may be used for other patterns.

Figure 8:
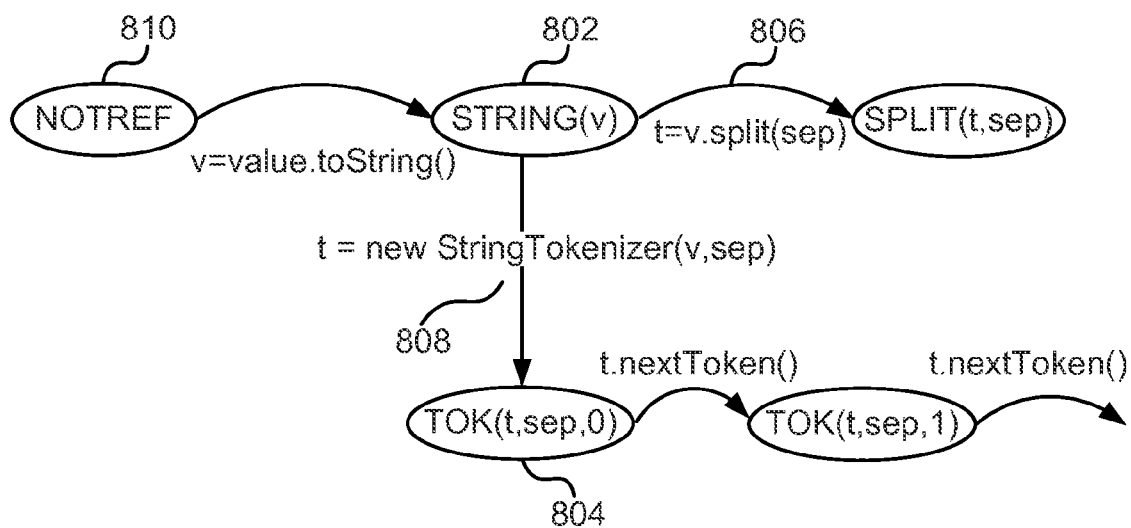
FIG. 8 is a schematic diagram of a transition system for column selector analysis.

The analysis first assigns to each program point one of the states from FIG. 8 to capture the current representation of the input (block 702), either as a string (state STRING 802) or a sequence of tokens (state TOK 804). Calls to String. split( ) or StringTokenizer( ) result in state transitions (as indicated by arrows 806 and 808 respectively in FIG. 8). For the example GeoLocation map job given above the initial state in the beginning of map is NOTREF 810, to mean that the input value has not been used yet. At line 6 the call to toString( ) transitions to state STRING(dataRow). At line 7 the state becomes TOK(dataTokenizer, "\t", 0). The last parameter of TOK represents the current token position of dataTokenizer, which advances to 1, 2, and 3 in the subsequent lines. The rest of the code does not affect the state: note that StringTokenizer is used again, but not on the input string, and hence this does not cause a state change.

An error state (not shown in FIG. 8) is also included to catch tokenization patterns that are not supported. Unexpected transitions, such as referencing the original input when in the TOK state, lead to the error state. If an error state is reached ('Yes' in block 704 of FIG. 7), then the analysis is abandoned (block 706), no column selector is generated, and the methods described herein conservatively default to transmitting the input row unmodified. Furthermore, to allow for a statically unknown number of calls to nextToken( ) (e.g. resulting from loops) the analysis also includes another variation of the TOK state, which is written as TOKAFTER (t,sep,n) and signifies that the current position of the tokenizer t is at or somewhere after n. In an example implementation this set of states may be extended to form a lattice and, as in the static analysis for row filtering, SAWJA's static analysis framework is instantiated to compute the final map from program points to one of these states.

Assuming that no error states have been produced ('No' in block 704), all program points that dereference an input token used in the rest of the map job are identified (block 708). The computed state at each of these program points is then consulted (block 710), which gives a concrete position or a numerical constraint about the tokens used. Finally code is generated that iterates over all tokens and emits those that are of interest (block 712), i.e. those tokens which are dereferenced in the program, based on the constraints, as shown in the column selector listing above. As described above with reference to FIG. 5, the generated code may then be compiled (e.g. using a standard Java compiler) to create an executable filter or the Java bytecode may be generated directly (within block 712). Hence the column selection is safe, even when several control flow paths of the mapper can assume different numbers of columns present in the input row.

Although the description above uses string tokenization input patterns by way of example, the same technique extends to other input usage models, such as field selection from binary data or substring selection from the input row.

For a generated (row or column) filter to be correct, the output of the mapper must be the same for both the filtered and the original unfiltered input data set. Correctness can be ensured by enforcing the following properties: single-record correctness, globally-stateless mappers and isolation and these are described in more detail below.

Single-record correctness means that if the filter rejects an input row, then calling the mapper on that row will result in no output. Furthermore, if the mapper produces an output on the original row, then calling mapper on the column filtered row will produce the same output.

Single-record correctness is not sufficient for end-to-end correctness, if state can be shared across different invocations of the mapper. Filtered and unfiltered input may result in the same output but may modify internal state (such as fields of the mapper class or static fields). If this state could then affect the output of future invocations, then the output of the mapper may be affected by filtering the input dataset. For example if map maintained a count of input records, and enabled output only for every 10th record, then it may not be correct to filter out any records, even those which do not directly generate output. Map methods do not usually maintain such state (state such as counters is typically handled by reducers). However, globally-stateless mappers means that if map is not stateless, then no filter should be generated.

One way to ensure statelessness is to disallow all access to global state. However this is too restrictive: mappers often read configuration or job parameter information from fields initialized when the job is started. In some cases, mappers also need to update class fields. For example, in the GeoLocation map job (see above), line 25-27, the variables geoLocationKey and geoLocationName are updated. However, the updated values are immediately output.

Hence a less restrictive condition is used which allows accesses to fields of the mapper class, but ensures that if such a field is read in any execution path of the mapper then (i) that field is set earlier in the same execution path (as in GeoLocation), or (ii) that field is never updated in any execution path of the mapper. To handle calls to external library methods whitelisting is used. Methods are only whitelisted if they are known not to mutate their arguments or receiver object, and calls to such methods are allowed. Calls to non-whitelisted methods are only allowed if they cannot be passed an argument that contains a reference to any global variable (this is ensured by a data-flow analysis).

Isolation refers to ensuring that filters for one job cannot affect other jobs or the external environment, such as performing filesystem I/O or loading classes dynamically via class loaders, or calling methods of the OutputCollector argument.

In the examples described above, the data stored in the storage cluster 104 and accessed by the filtering proxy 112 (e.g. in block 306 of FIG. 3) is uncompressed data. In some implementations of storage nodes, the data is stored in a compressed form in order to reduce storage and network costs. The processing nodes understand the compression algorithm and can decompress the data before processing them. The method shown in FIG. 3 may be modified, as shown in the example flow diagram of FIG. 9. Here the filtering proxy 112 decompresses the data which it has accessed from the storage device (block 907) before applying the filter (block 308). Having created the filtered data (in block 308) the filtering proxy may send the filtered data to the compute cluster 102 in uncompressed form (block 310), as in FIG. 3, or alternatively, the filtering proxy 112 may compress the filtered data (block 910) and then provide the compressed filtered data to the compute cluster (block 912). Using this method, the executable filters may be used transparently on compressed data with a small additional CPU overhead of uncompressing and recompressing the data in the filtering proxy 112.

In a further variation on FIG. 3, as indicated by the dotted arrow in the flow chart, the filtering proxy 112 may access uncompressed data from the storage node (in block 306), filter the data (in block 308) and then compress the filtered data (in block 910) before providing it to the compute node (in block 912). This reduces the amount of data sent over the network from the storage cluster 104 to the compute cluster 102 compared to the method shown in FIG. 3.

The methods described above are aimed at reducing the amount of data fetched by each job (e.g. each Hadoop job) independent of other jobs running on the same cluster. However, if users repeatedly run the same or similar job (e.g. periodically re-running a job to account for new input data), current approaches will fetch the data multiple times. Bandwidth may be further optimized by caching input data at or near the compute nodes. For example, a Hadoop compute cluster could cache data in the HDFS file system that is already used to stage intermediate results of the computation.

Figure 10:
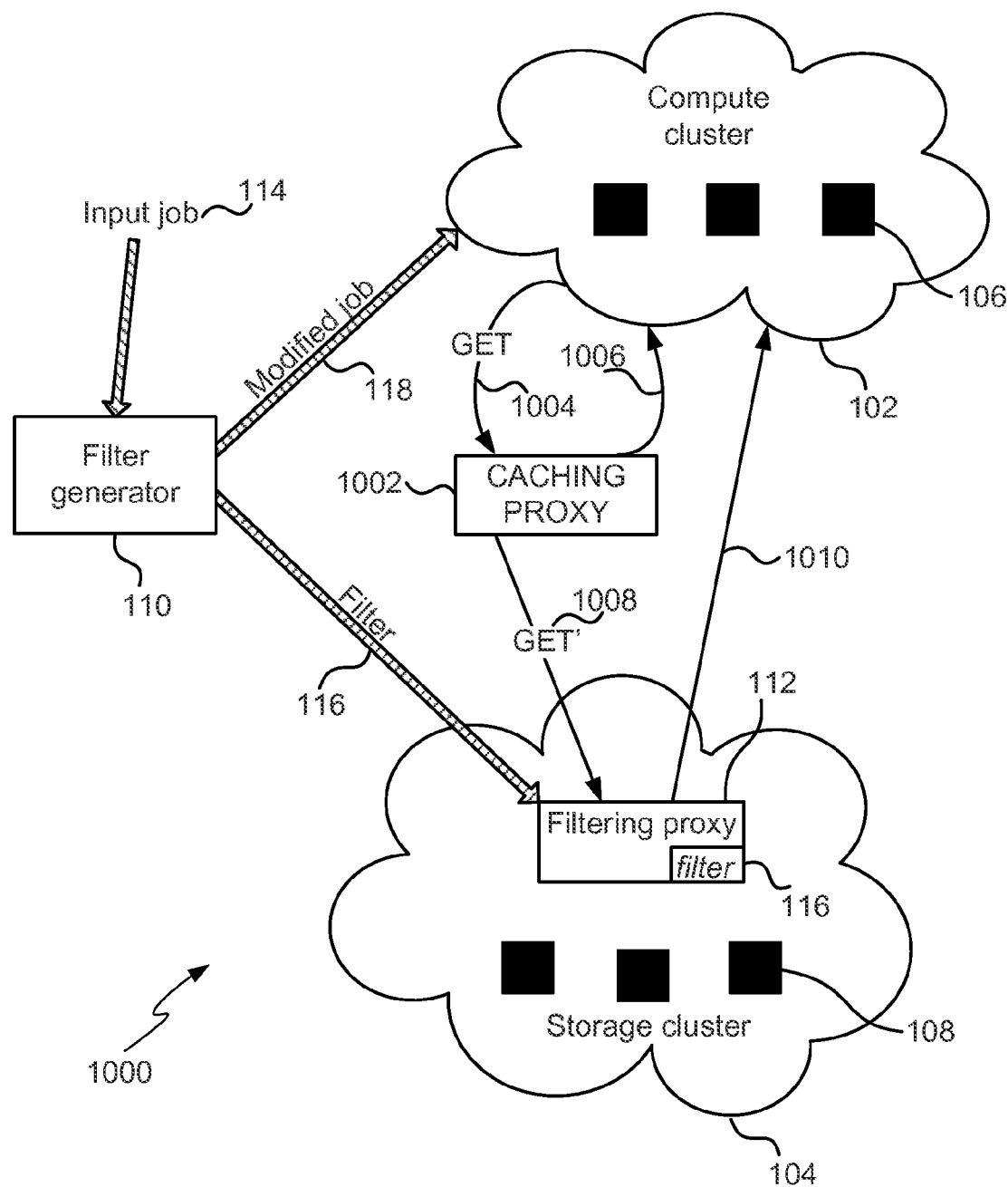
FIG. 10 is a schematic diagram of another system architecture which reduces traffic between storage and compute infrastructures for data analytics jobs.

FIG. 10 shows a system architecture 1000 which a variation of that shown in FIG. 1 and described above. The system shown in FIG. 10 includes an optional, best-effort caching proxy (or proxy component) 1002. The caching proxy 1002 can run anywhere between the compute nodes 106 and the filtering proxy 112 downstream of a bottleneck link and may for example be located close to the compute nodes 106 (e.g. within the compute cluster 102). It will also be appreciated that there may be more than one caching proxy 1002. The term 'best-effort' is used herein in relation to caching to refer to that that the cache resources such as local files on compute nodes are not guaranteed to be available and could be lost at any time and as a result the caching itself is not guaranteed.

An example method of operation of the caching proxy 1002 can be described with reference to the flow diagram shown in FIG. 11. The caching proxy 1002 manages a local cache. In an example implementation, each cache entry in the local cache corresponds to a unique <fileID;filterID> pair. The caching proxy (or caching proxy component) 1002 intercepts all requests 1004 to the filtering proxy 112 (block 1102) and compares the requested data to the available cached filtered data (blocks 1104 and 1108). If a read request matches a cache entry ('Yes' in block 1104), e.g. where both the file ID and the filter ID of a cache entry match the requested data and the version of the file in the storage node has not changed since the results were cached, the request is served entirely locally, i.e. the caching proxy 1002 provides the matching cached filtered data 1006 to the compute cluster 102 in response to the intercepted request 1004 (block 1106). The proxy may check whether the version of the stored file has changed by checking one or more file properties, such as file modification time, file size, etc.

If instead, there is only a partial match between the requested data and any cached data ('No' in block 1104 and 'Yes' in block 1108), the request is split into a local cache request and a remote request (block 1110). The local cache request can be served locally by providing the appropriate cached filtered data to the compute cluster/node (block 1106) and the remote request 1008 is forwarded to the filtering proxy 112 (block 1112). In generating the remote request 1008 (in block 1110), the filter specification in the remote request may be replaced with a 'delta' filter specification that fetches only the data (e.g. the rows and/or columns) missing from the locally cached version.

In an example, the partial match may be a request where the file ID matches but a different filter was used to generate the cached filtered data (i.e. a different filter was applied to the same data as detailed in the intercepted request). The delta filter specification used in such a situation can be described with reference to an example. If a job requests data filtered by a Boolean filter $f_2(r)$, and the cache already contains the same object but filtered by a different Boolean filter $f_1(r)$, then the delta filter is a function that computes $f_2(r) \wedge \neg f_1(r)$. In an example implementation, this Boolean expression may be encoded into the filter specification, and the filtering proxy 112 computes it (e.g. in block 308 of FIG. 3) by executing the methods that represent $f_1$ and $f_2$, sequentially. In another example implementation, the delta filter may be generated as an entire expression, which increases efficiency.

Instead of including a delta filter specification within the remote request, the remote request may contain two filter specifications, e.g. the new filter and the old filter ($f_2(r)$ and $f_1(r)$ in the example above) and the filtering proxy 112 may then run both filters and only send the difference in the data (i.e. the additional filtered data when the results from running the new filter are compared to the results from running the old filter).

In another example, the partial match (identified in block 1108) may be a request where the filter ID is the same (i.e. the same filter was used) but the file ID identifies additional data which has not been filtered in the cached filtered data. In such an instance, the delta filter specification identifies the incremental data to which the filter is to be applied. This situation may, for example, occur where a user regularly repeats a job and each time runs it on all available data which includes the data processed previously and any new data which has been generated since the last job was run.

In some examples there may be some data which is provided by the caching proxy 1002 to the compute cluster 102 (in block 1106) that is not required, e.g. where the cached filtered data relates to input data files A and B and the intercepted request related to input files A and C. Where the cached filtered data is stored close to the compute cluster (e.g. between the bottleneck and the compute cluster) there is little cost associated in transmitting the additional data and this avoids having to send input file A over the bottleneck link. In other examples, however, filtering may also be implemented at the caching proxy 1002 such that the cached filtered data may be filtered, if required, before the data is provided to the compute cluster 102 (in block 1106). For example, where the cached filtered data relates to input data files A and B and the intercepted request related to input files A and C, the cached filtered data may be filtered to remove the data relating to input data file B. Data relating to input data file C is obtained separately through the remote request, which is forwarded to the filtering proxy in block 1112.

Figure 11:
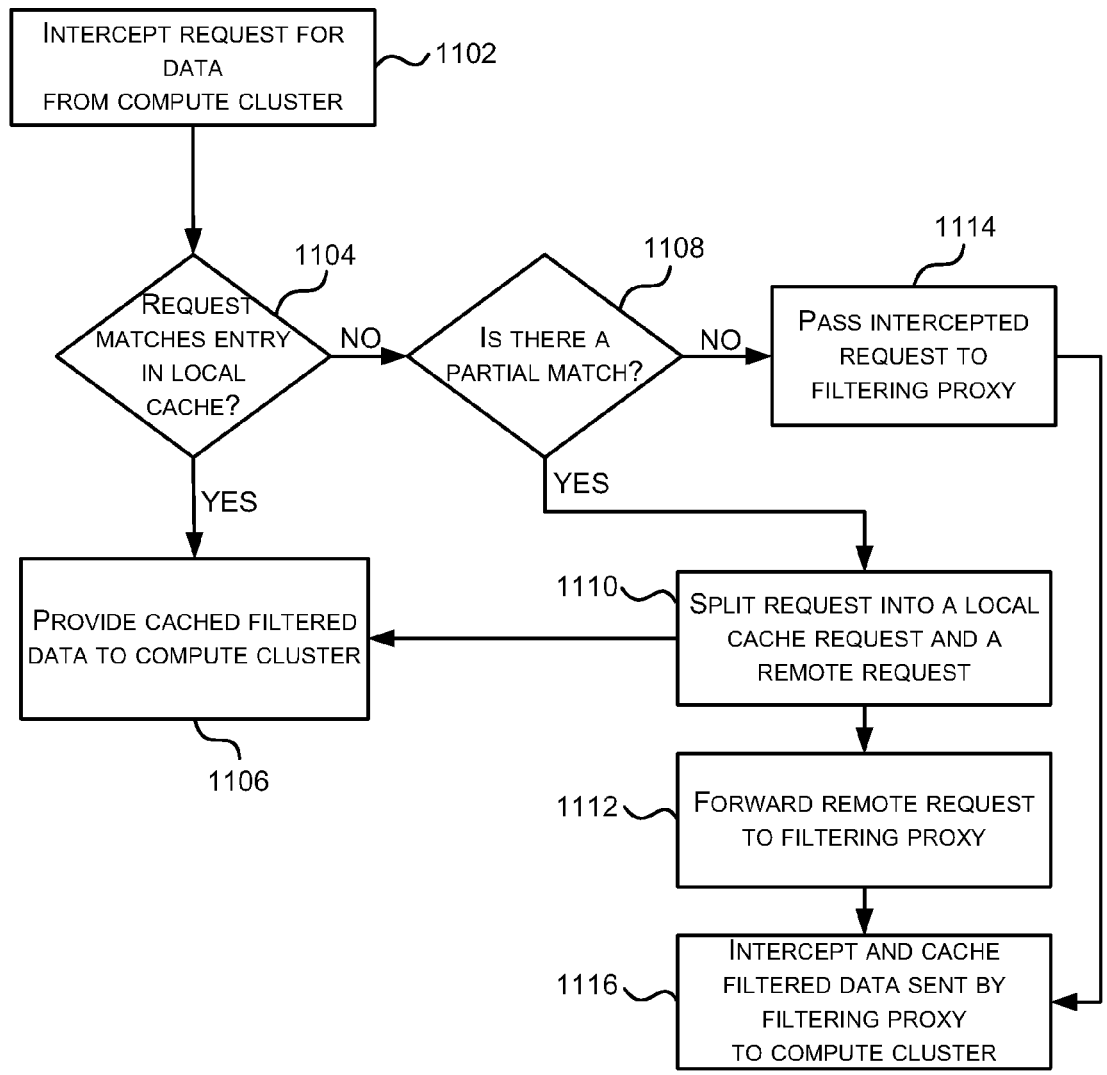
FIG. 11 is a flow diagram of an example method of operation of a caching proxy.

The final step shown in FIG. 11 is the intercepting and caching of data, by the caching proxy 1002, of filtered data sent from the filtering proxy 112 to the compute cluster 102 (e.g. as in block 310 of FIG. 3). As described above, any filtered data is stored with meta-data which identifies the original input data which has been filtered, and the filter specification used in performing the filtering.

The methods described above generate filters which are executable. In some example implementations, the methods may also generate non-executable symbolic versions of the filters in addition to (and not instead of) the executable filters. Such symbolic versions provide information about the relationship between filters (e.g. whether one filter subsumes another) and this may, for example, be used in the generation of delta filters (e.g. in block 1110 of FIG. 11).

Figure 12:
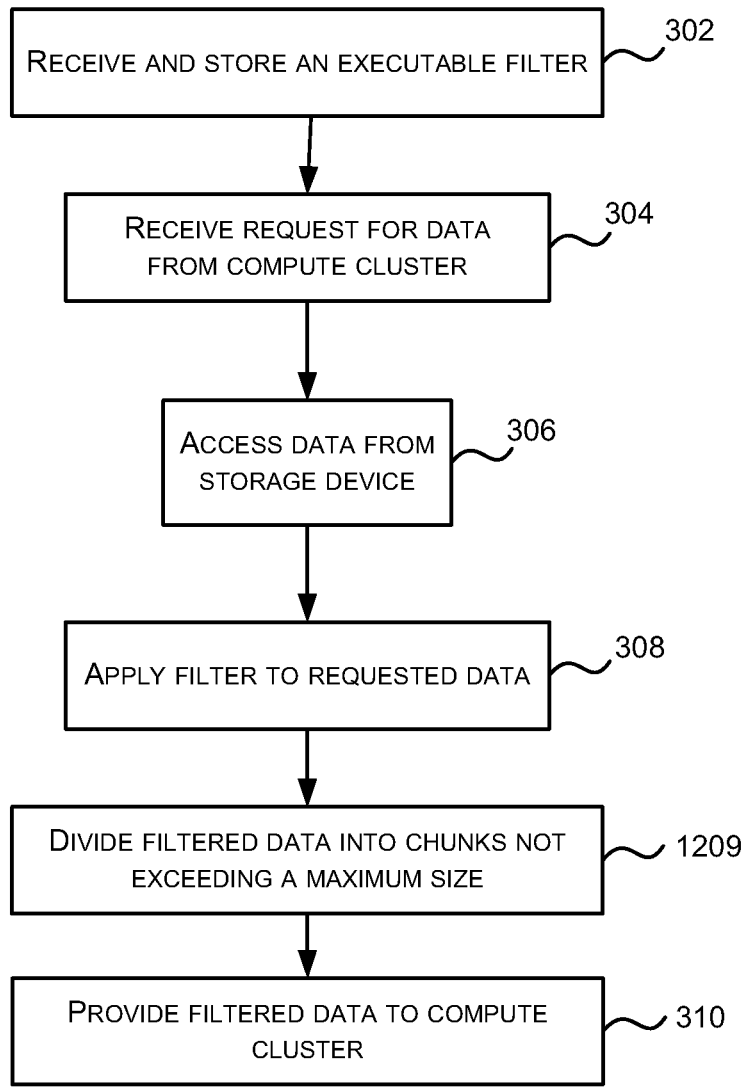

FIG. 12 is a flow diagram of another example method of operation of the filtering proxy 112 and which is a variation of that shown in FIG. 3 and described above. It will be appreciated that this variation may also be applied to the method shown in FIG. 9. As shown in FIG. 12, having generated the filtered data (in block 308), the filtering proxy 112 divides the filtered data into chunks which do not exceed a maximum specified size. This maximum specified size may be set dependent upon the framework used to perform the computation such that the compute cluster 102 does not need to divide the chunks of data up in order to share the data between compute nodes 106 (a technique which is known as byte-ranging). Using this method, the filtering proxy 112 can combine small chunks of data together (as the forwarded chunks may be much smaller than the original chunks retrieved from the storage device since data has been removed by filtering). This makes the computation more efficient, as each filtered chunk received by the compute node is processed by one compute task and reduces network overheads.

Figure 9:
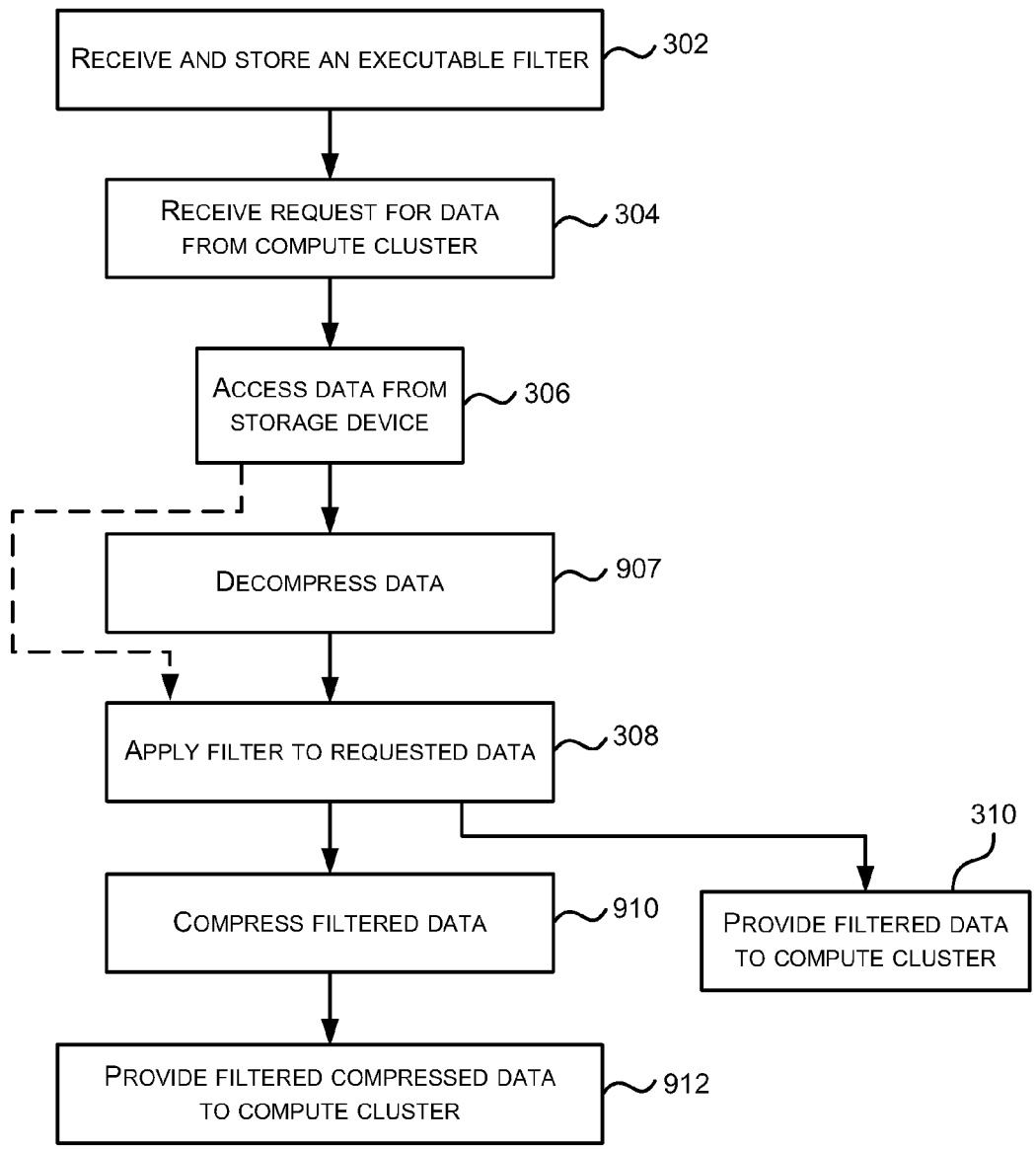
FIGS. 9, 12 and 13 are flow diagrams of further example methods of operation of a filtering proxy.
Figure 13:
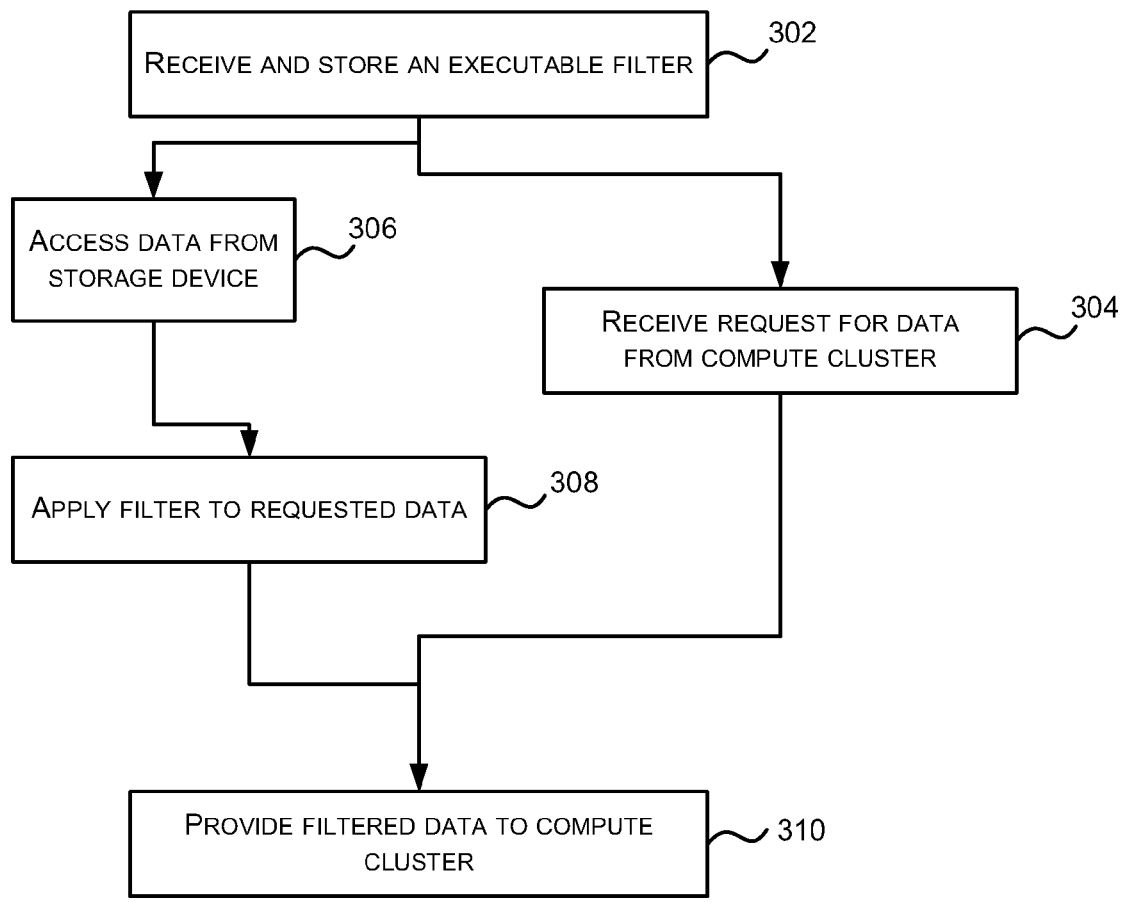

FIG. 13 is a flow diagram of a further example method of operation of the filtering proxy 112. Although this method is shown as a variation of the method shown in FIG. 3, it will be appreciated that the variation may also be used in combination with any aspects of the other example methods of operation of the filtering proxy 112 described herein (e.g. as shown in FIGS. 9 and 12). As shown in FIG. 13, this variation involves performing the steps of FIG. 3 in a slightly different order. Having received and stored an executable filter (in block 302), the filtering proxy 112 starts filtering data (in blocks 306 and 308) before it has actually received the request for data from the compute cluster (in block 304). When the filtering proxy 112 subsequently receives the request (in block 304) it may ask for a list of files A, B, C, D, E . . . . As the filtering proxy 112 may not have started filtering data (in block 308) in the order defined in the request, the filtering proxy may then provide any suitable filtered data which is already available initially (in block 310, e.g. filtered versions of files B and C) and then provide the remaining files (e.g. filtered versions of files A, D and E) subsequently. This pre-computation enables the filtering proxy 112 to use the short window of time between receiving an executable filter (in block 302) and receiving a request for filtered data from a compute cluster (in block 304). In implementing this method, there is additional communication with the filtering proxy 112 such that it receives both the filter and details of the input data (e.g. the URL of the data) from the filter generator 110. This enables the filtering proxy 112 to start filtering data (in blocks 306-308) prior to receiving the request (in block 304).

Figure 14:
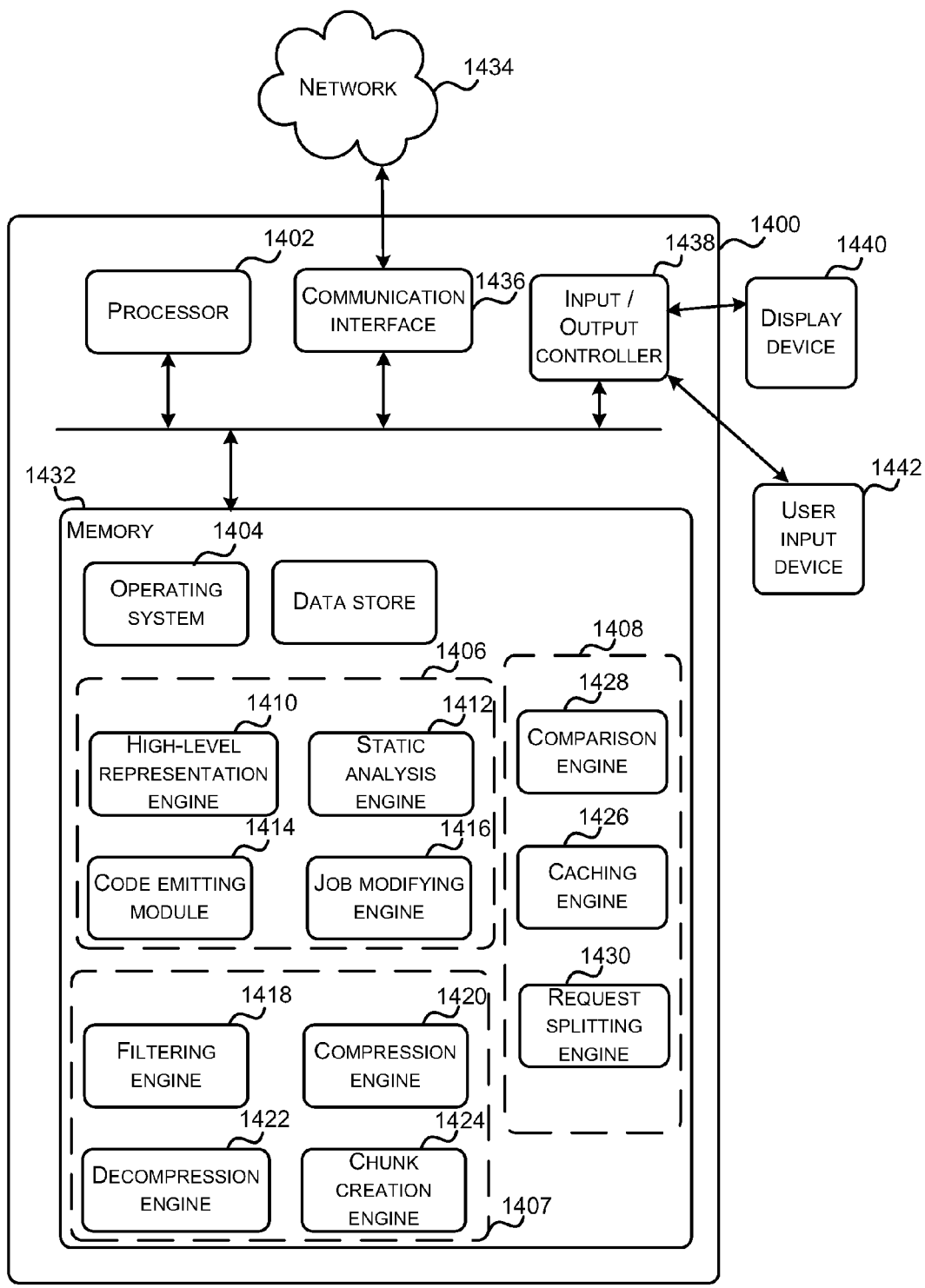
FIG. 14 illustrates an exemplary computing-based device in which embodiments of the methods described herein may be implemented.

FIG. 14 illustrates various components of an exemplary computing-based device 1400 which may be implemented as any form of a computing and/or electronic device, and in which embodiments of the methods described herein may be implemented. In particular, the computing-based device 1400 may operate as a filter generator 110, filtering proxy 112 or caching proxy 1002 and in some examples the same computing-based device 1400 may operate as more than one of these functional entities.

Computing-based device 1400 comprises one or more processors 1402 which may be microprocessors, controllers or any other suitable type of processors for processing computer executable instructions to control the operation of the device in order to perform the methods described herein (e.g. as shown in any of FIGS. 2, 3, 5, 7, 9, and 11-13). In some examples, for example where a system on a chip architecture is used, the processors 1402 may include one or more fixed function blocks (also referred to as accelerators) which implement a part of the methods described herein (e.g. the static analysis in block 206 or the application of the filter in block 308) in hardware (rather than software or firmware). Platform software comprising an operating system 1404 or any other suitable platform software may be provided at the computing-based device to enable application software 1406-14xx to be executed on the device.

FIG. 14 shows three sets of application software 1406-1408. The first set 1406 relates to operation of the computing-based device 1400 as a filter generator and comprises a high-level representation generating engine 1410, a static analysis engine 1412, a code emitting module 1414 and a job modifying engine 1416. The output of the static analysis engine 1412 is a data structure comprising a stripped-down version of the high-level representation which expresses which input parts of the data are going to be examined by the processing job. The code emitting module 1414 takes this output from the static analysis engine 1412 and performs an operation which is similar to compilation to create the executable filter (e.g. including renaming variables, adjusting types etc as required).

The second set of application software 1407 relates to operation of the computing-based device 1400 as a filtering proxy and comprises a filtering engine 1418. This set of application software 1407 may further comprise one or more of: a compression engine 1420, a decompression engine 1422 and a chunk creation engine 1424 (which implements block 1209 of FIG. 12).

The third set 1408 relates to operation of the computing-based device 1400 as a caching proxy. This set comprises a caching engine 1426 which intercepts and caches filtered data (e.g. as in block 1116 in FIG. 11), a comparison engine 1428 which compares requests to cached data (e.g. as in blocks 1104 and 1108 of FIG. 11) and a request splitting/generating engine 1430 which splits intercepted requests into requests that can be served locally and one or more remote requests that can then be forwarded onto a filtering proxy (as shown in FIG. 11 and described above).

The computer executable instructions may be provided using any computer-readable media that is accessible by computing based device 1400. Computer-readable media may include, for example, computer storage media such as memory 1432 and communications media. Computer storage media, such as memory 1432, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Although the computer storage media (memory 1432) is shown within the computing-based device 1400 it will be appreciated that the storage may be distributed or located remotely and accessed via a network 1434 or other communication link (e.g. using communication interface 1436).

The communication interface 1436 connects the computing-based device 1400 to other devices via a network 1434 or other communication link. For example, where the computing-based device 1400 operates as a filter generator, the communication interface 1436 is used to receive input jobs (as in block 202 of FIG. 2) and output executable filters (in block 208) to a filtering proxy and modified versions of the input job (in block 212) to a compute cluster.

The computing-based device 1400 may also comprise an input/output controller 1438 arranged to output display information to a display device 1440 which may be separate from or integral to the computing-based device 1400. The display information may provide a graphical user interface. The input/output controller 1438 may also be arranged to receive and process input from one or more devices, such as a user input device 1442 (e.g. a mouse or a keyboard). Where the computing-based device 1400 operates as a filter generator, this user input may, for example, be used to receive an input job entered directly by a programmer. In an embodiment the display device 1440 may also act as the user input device 1442 if it is a touch sensitive display device. The input/output controller 1438 may also output data to devices other than the display device, e.g. a locally connected printing device (not shown in FIG. 14).

The methods described above have been evaluated in various testbeds using the three example jobs outlined above: FindUserUsage, ComputeIoVolumes and GeoLocation. The testbeds evaluated both the in-cloud and private-public cloud scenarios (e.g. as described above with reference to FIG. 4. Results showed that the overall job runtime was reduced by 58%, 62% and 9% respectively for FindUserUsage, ComputeIoVolumes and GeoLocation. Thus it more than doubles the performance of the two large jobs. The GeoLocation job is very small and its runtime is dominated by constant factors such as JVM startup and Hadoop co-ordination. Furthermore, if only fetch time are considered (i.e. excluding the time taken to actually perform the computation, the benefits were slightly higher at 66%, 68% and 12%.

In the private-public scenario, costs are also a factor. As described above, the methods described herein reduce dollar costs by trading cloud-based computation, a cheap resource, for more expensive egress bandwidth. Calculations estimate that the methods described above reduce the cost of the two larger jobs by 40% and 45% respectively. Measured CPU utilization on the filtering proxy in the testbeds was low (less than 9% for all jobs), with the network always being the bottleneck.

The above results were obtained using both row and column filtering. It will be appreciated that the comparative effects of row filtering and column filtering may be different for different jobs and according to the methods described herein row filtering and column selection (or filtering) may be individually disabled, for example if their overheads are high. In an example, for the FindUserUsage example job described above, use of column selection only (and not row filtering) would be appropriate whereas for ComputeIoVolumes both row filtering and column selection may be used.

Although the present examples are described and illustrated herein as being implemented in a cloud-based system, the system described is provided as an example and not a limitation. As those skilled in the art will appreciate, the present examples are suitable for application in a variety of different types of data analytics systems including computing clusters or any other collection of computing hardware comprising processing nodes and storage nodes. The methods are not limited to cloud-based implementations. It will further be appreciated that although the above examples refer to Hadoop MapReduce jobs, this is by way of example only and the systems and methods described are also applicable to other data processing tools (e.g. which use different language runtimes) and other types of jobs.

The methods described above enable programs (or jobs) to run on a compute cluster against any store that can be used in current systems. The filters which are automatically generated are interposed on the data path between the storage and compute so that only data that is to be processed and which will affect the output of the processing is transferred. The methods push computation into the storage layer and do not require any explicit input from the programmer. The computation performed is determined automatically using static analysis. Furthermore the filters only suppress irrelevant data rather than transforming or processing the data in other ways. At any point in an execution the filter can be disabled and the correctness of the job will not be impacted.

The methods described above are orthogonal to other work on improving the performance of MapReduce which relates to scheduling of jobs and handing of failures, in that the methods described herein reduce (and in some examples minimize) the storage to compute bandwidth requirements.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method comprising:
   receiving, at a filter generator, a compiled input data processing job;
   creating a high-level representation of the compiled input data processing job;
   applying static analysis to the high-level representation to automatically generate an executable filter, the executable filter being arranged, when applied to data, to selectively suppress data elements which do not influence an output of the data processing job;
correctness of the executable filter being ensured through enforcement of single-record correctness, globally-stateless mappers, and isolation;
outputting the executable filter to a filtering proxy; and
at least one of:
  modifying a uniform resource identifier within the compiled input data processing job to point to the filtering proxy, embedding a filter specification in each uniform resource identifier, and outputting the modified compiled input data processing job;
  applying static analysis to the high-level representation to automatically generate an executable filter further comprising at least one of:
    identifying a set of output instructions within the high-level representation, identifying, for each program point in the high-level representation, those instructions in the high-level representation that can affect values of variables at that program point, generating a set of control flow instructions from the high-level representation for each output instruction, the set of control flow instructions comprising those control flow instructions that may lead to the output instruction, and generating an executable filter comprising code corresponding to the sets of control flow instructions and those instructions that can affect values of variables in each control flow instruction with output labels replaced with a return true statement;
    identifying a set of output labels within the high-level representation, collecting a set of control flow labels that form part of an execution path leading to an output label, computing, for each point in the high-level representation, a map from a variable to labels selected from the set of labels which may influence a value of the variable at that point, identifying, for each control flow label in the set of control flow labels and using the map, at least one relevant set of control flow labels comprising those labels that can affect the value of a variable used in the control flow label to perform a jump, and generating an executable filter comprising code corresponding to the one or more relevant sets of control flow labels by replacing output labels with a return true statement and by inserting a return false statement at all other exits from the control flow graph; or
    assigning a state to each program point within the high-level representation, the state capturing a representation, at that program point, of an input to the data processing job as either a string or a sequence of tokens, identifying program points within the high-level representation that de-reference an input token used subsequently in the data processing job, at each identified program point, determining a constraint associated with at least one token used from a computed state at that program point, and generating an executable filter comprising code which iterates over all sequences of tokens and emits any input tokens that are dereferenced in the high-level representation;
  ensuring that, if a mapper class field is read in an execution path of the globally stateless mapper, at least one of, the mapper class field is set earlier in the execution path than the filter, or the mapper class field is not updated in any execution path of the globally stateless mapper; or
  receiving and storing the executable filter at the filtering proxy, intercepting, at a caching proxy, a request for data from a compute node, performing a comparison at the caching proxy, to determine if the requested data is available in a local cache, if at least a portion of the requested data is available in the local cache, providing cached filtered data to the compute node, if at least a portion of the requested data is not available in the local cache, sending a request for that unavailable data to the filtering proxy, and in response to receiving the request from the caching proxy at the filtering proxy, accessing the requested data from a storage node, dynamically applying the executable filter to the data to generate filtered data; and providing the filtered data to the compute node.

2. The method according to claim 1, further comprising:
modifying the compiled input data processing job to reference the filtering proxy; and
outputting the modified compiled input data processing job.

3. The method according to claim 2, wherein modifying the compiled input data processing job comprises:
modifying a uniform resource identifier within the compiled input data processing job to point to the filtering proxy; and
embedding a filter specification in each uniform resource identifier.

4. The method according to claim 1, wherein the data elements comprise rows within the data.

5. The method according to claim 4, wherein applying static analysis to the high-level representation to automatically generate an executable filter comprises:
identifying a set of output instructions within the high-level representation;
identifying, for each program point in the high-level representation, those instructions in the high-level representation that can affect values of variables at that program point;
generating a set of control flow instructions from the high-level representation for each output instruction, the set of control flow instructions comprising those control flow instructions that may lead to the output instruction; and
generating an executable filter comprising code corresponding to the sets of control flow instructions and those instructions that can affect values of variables in each control flow instruction with output labels replaced with a return true statement.

6. The method according to claim 4, wherein applying static analysis to the high-level representation to automatically generate an executable filter comprises:
identifying a set of output labels within the high-level representation;
collecting a set of control flow labels that form part of an execution path leading to an output label;
computing, for each point in the high-level representation, a map from a variable to labels selected from the set of labels which may influence a value of the variable at that point;
identifying, for each control flow label in the set of control flow labels and using the map, at least one relevant set of control flow labels comprising those labels that can affect the value of a variable used in the control flow label to perform a jump; and generating an executable filter comprising code corresponding to the one or more relevant sets of control flow labels by replacing output labels with a return true statement and by inserting a return false statement at all other exits from the control flow graph.

7. The method according to claim 1, wherein the data elements comprise column entries within a row of data.

8. The method according to claim 7, wherein applying static analysis to the high-level representation to automatically generate an executable filter comprises:
assigning a state to each program point within the high-level representation, the state capturing a representation, at that program point, of an input to the data processing job as either a string or a sequence of tokens;
identifying program points within the high-level representation that de-reference an input token used subsequently in the data processing job;
at each identified program point, determining a constraint associated with at least one token used from a computed state at that program point; and
generating an executable filter comprising code which iterates over all sequences of tokens and emits any input tokens that are dereferenced in the high-level representation.

9. The method according to claim 1, further comprising:
receiving and storing the executable filter at the filtering proxy;
in response to receiving a request for data from a compute node, accessing the data from a storage node and dynamically applying the executable filter to the data to generate filtered data; and
providing the filtered data to the compute node.

10. The method according to claim 1, further comprising:
receiving and storing the executable filter at the filtering proxy;
intercepting, at a caching proxy, a request for data from a compute node;
performing a comparison at the caching proxy, to determine if the requested data is available in a local cache;
if at least a portion of the requested data is available in the local cache, providing cached filtered data to the compute node;
if at least a portion of the requested data is not available in the local cache, sending a request for that unavailable data to the filtering proxy; and
in response to receiving the request from the caching proxy at the filtering proxy, accessing the requested data from a storage node, dynamically applying the executable filter to the data to generate filtered data; and providing the filtered data to the compute node.

11. A method comprising:
receiving and storing an executable filter at a filtering proxy;
correctness of the executable filter being ensured through enforcement of single-record correctness, globally-stateless mappers, and isolation;
in response to receiving a request for data from a compute node, accessing the data from a storage node and dynamically applying the executable filter to the data to generate filtered data;
providing the filtered data to the compute node; and
at least one of:
receiving a modified compiled input data processing job, the modified compiled input data processing job further comprising a uniform resource identifier that points to the filtering proxy and a filter specification;
the executable filter being generated based at least in part on applying static analysis to a high-level representation of a compiled input data processing job, the static analysis comprising at least one of:
identifying a set of output instructions within the high-level representation, identifying, for each program point in the high-level representation, those instructions in the high-level representation that can affect values of variables at that program point, generating a set of control flow instructions from the high-level representation for each output instruction, the set of control flow instructions comprising those control flow instructions that may lead to the output instruction, and generating an executable filter comprising code corresponding to the sets of control flow instructions and those instructions that can affect values of variables in each control flow instruction with output labels replaced with a return true statement;
identifying a set of output labels within the high-level representation, collecting a set of control flow labels that form part of an execution path leading to an output label, computing, for each point in the high-level representation, a map from a variable to labels selected from the set of labels which may influence a value of the variable at that point, identifying, for each control flow label in the set of control flow labels and using the map, at least one relevant set of control flow labels comprising those labels that can affect the value of a variable used in the control flow label to perform a jump, and generating an executable filter comprising code corresponding to the one or more relevant sets of control flow labels by replacing output labels with a return true statement and by inserting a return false statement at all other exits from the control flow graph; or
assigning a state to each program point within the high-level representation, the state capturing a representation, at that program point, of an input to the data processing job as either a string or a sequence of tokens, identifying program points within the high-level representation that de-reference an input token used subsequently in the data processing job, at each identified program point, determining a constraint associated with at least one token used from a computed state at that program point, and generating an executable filter comprising code which iterates over all sequences of tokens and emits any input tokens that are dereferenced in the high-level representation;
ensuring that, if a mapper class field is read in an execution path of the globally stateless mappers, at least one of, the mapper class field is set earlier in the execution path than the filter, or the mapper class field is not updated in any execution path of the globally stateless mapper; or
intercepting, at a caching proxy, a request for data from a compute node, performing a comparison at the caching proxy, to determine if the requested data is available in a local cache, if at least a portion of the requested data is available in the local cache, providing cached filtered data to the compute node, if at least a portion of the requested data is not available in the local cache, sending a request for that unavailable data to the filtering proxy, and in response to receiving the request from the caching proxy at the filtering proxy, accessing the requested data from a storage node, dynamically applying the executable filter to the data to generate filtered data; and providing the filtered data to the compute node.

12. The method according to claim 11, further comprising:
in response to a trigger condition, stopping the application of the executable filter and providing unfiltered data from the storage node to the compute node.

13. The method according to claim 11, wherein the data accessed from the storage node comprises compressed data and the method further comprising:
decompressing the accessed data prior to dynamically applying the executable filter; and
compressing the filtered data, and
wherein providing filtered data to the compute node comprises providing compressed filtered data to the compute node.

14. The method according to claim 11, further comprising dividing the filtered data into chunks of filtered data, each chunk not exceeding a pre-defined size, prior to providing the filtered data to the compute node.

15. The method according to claim 11, further comprising accessing the data from a storage node and dynamically applying the executable filter to the data to generate filtered data prior to receiving the request for data from the compute node.

16. A system comprising:
a storage cluster comprising a plurality of storage nodes arranged to store data;
a filter generator arranged to automatically generate an executable filter associated with a data processing job using static analysis, the executable filter being arranged to suppress one or more data elements which do not affect an output of the data processing job;
correctness of the executable filter being ensured through enforcement of single-record correctness, globally-stateless mappers, and isolation;
a filtering proxy arranged to dynamically apply the executable filter to data accessed from the storage cluster in response to a request for data from a compute cluster and to provide filtered data to the compute cluster in response to the request, wherein the request for data identifies the executable filter; and
at least one of:
the filtering proxy further arranged to receive a modified compiled input data processing job, the modified compiled input data processing job further comprising a uniform resource identifier that points to the filtering proxy and a filter specification;
generating the executable filter comprising applying static analysis to a high-level representation of a compiled input data processing job, the static analysis comprising at least one of:
identifying a set of output instructions within the high-level representation, identifying, for each program point in the high-level representation, those instructions in the high-level representation that can affect values of variables at that program point, generating a set of control flow instructions from the high-level representation for each output instruction, the set of control flow instructions comprising those control flow instructions that may lead to the output instruction, and generating an executable filter comprising code corresponding to the sets of control flow instructions and those instructions that can affect values of variables in each control flow instruction with output labels replaced with a return true statement;
identifying a set of output labels within the high-level representation, collecting a set of control flow labels that form part of an execution path leading to an output label, computing, for each point in the high-level representation, a map from a variable to labels selected from the set of labels which may influence a value of the variable at that point, identifying, for each control flow label in the set of control flow labels and using the map, at least one relevant set of control flow labels comprising those labels that can affect the value of a variable used in the control flow label to perform a jump, and generating an executable filter comprising code corresponding to the one or more relevant sets of control flow labels by replacing output labels with a return true statement and by inserting a return false statement at all other exits from the control flow graph; or
assigning a state to each program point within the high-level representation, the state capturing a representation, at that program point, of an input to the data processing job as either a string or a sequence of tokens, identifying program points within the high-level representation that de-reference an input token used subsequently in the data processing job, at each identified program point, determining a constraint associated with at least one token used from a computed state at that program point, and generating an executable filter comprising code which iterates over all sequences of tokens and emits any input tokens that are dereferenced in the high-level representation;
ensuring that, if a mapper class field is read in an execution path of the globally stateless mapper, at least one of, the mapper class field is set earlier in the execution path than the filter, or the mapper class field is not updated in any execution path of the globally stateless mapper; or
the system further arranged to receive and store the executable filter at the filtering proxy, intercept, at a caching proxy, a request for data from a compute node, perform a comparison at the caching proxy, to determine if the requested data is available in a local cache, if at least a portion of the requested data is available in the local cache, provide cached filtered data to the compute node, if at least a portion of the requested data is not available in the local cache, send a request for that unavailable data to the filtering proxy, and in response to receiving the request from the caching proxy at the filtering proxy, access the requested data from a storage node, dynamically apply the executable filter to the data to generate filtered data; and provide the filtered data to the compute node.

17. The system according to claim 16, wherein the filtering proxy is implemented on a storage node.

18. The system according to claim 16, wherein the system comprises a cloud-computing system.

19. The system according to claim 16, further comprising the compute cluster.

20. The system according to claim 16, further comprising a caching proxy comprising a local cache and arranged to intercept requests from the compute cluster to the filtering proxy and provide the filtered data to the compute cluster from the local cache.

\* \* \* \* \*